United States Patent
Honorio Araujo da Silva et al.

(10) Patent No.: US 11,323,255 B2
(45) Date of Patent: May 3, 2022

(54) METHODS AND SYSTEMS FOR ENCRYPTION AND HOMOMORPHIC ENCRYPTION SYSTEMS USING GEOMETRIC ALGEBRA AND HENSEL CODES

(71) Applicant: X-Logos, LLC, Colorado Springs, CO (US)

(72) Inventors: David W. Honorio Araujo da Silva, Colorado Springs, CO (US); Carlos A. Paz de Araujo, Colorado Springs, CO (US); Hanes Barbosa Marques de Oliveira, Colorado Springs, CO (US); Bryan S. Sosa Barillas, Chicago, IL (US)

(73) Assignee: X-Logos, LLC, Colorado Springs, CO (US)

( * ) Notice: Subject to any disclaimer, the term of this patent is extended or adjusted under 35 U.S.C. 154(b) by 85 days.

(21) Appl. No.: 16/984,117

(22) Filed: Aug. 3, 2020

(65) Prior Publication Data

US 2021/0036849 A1    Feb. 4, 2021

Related U.S. Application Data

(60) Provisional application No. 62/885,056, filed on Aug. 9, 2019, provisional application No. 62/883,988, filed on
(Continued)

(51) Int. Cl.
*H04L 9/00* (2006.01)
*H04L 9/08* (2006.01)
(Continued)

(52) U.S. Cl.
CPC ............ *H04L 9/0869* (2013.01); *H04L 9/008* (2013.01); *H04L 9/0825* (2013.01); *H04L 9/0891* (2013.01); *H04L 9/3066* (2013.01)

(58) Field of Classification Search
CPC ..... H04L 9/0869; H04L 9/008; H04L 9/0825; H04L 9/0891; H04L 9/3066
See application file for complete search history.

(56) References Cited

U.S. PATENT DOCUMENTS

| 8,515,058 B1 * | 8/2013 | Gentry | H04L 9/008 380/28 |
| 9,749,129 B2 | 8/2017 | Delerablee et al. | |

(Continued)

FOREIGN PATENT DOCUMENTS

| WO | 2012069747 A1 | 5/2012 |
| WO | 2014016795 A2 | 1/2014 |

OTHER PUBLICATIONS

The International Search Report and Written Opinion, PCT/US2020/44808, "Methods and Systems for Encryption and Homomorphic Encryption Systems using Geometric Algebra and Hensel Codes", dated May 4, 2021, 18 pages.

*Primary Examiner* — Darshan I Dhruv
(74) *Attorney, Agent, or Firm* — Christopher P. Whitham; Samuel M. Freund; Cochran Freund & Young LLC

(57) ABSTRACT

Disclosed are methods and systems to encrypt/decrypt a data message using Geometric Algebra and Hensel encoding (i.e., finite p-adic arithmetic). The security key(s), message data, and ciphertext are all represented as Geometric Algebra multivectors where a sum of the coefficients of an individual multivector is equal to the numeric value of the corresponding message or security key. Various Geometric Algebra operations with the message and security key multivectors act to encrypt/decrypt the message data. Each coefficient of the security key and message multivectors is further Hensel encoded to provide additional confusion/diffusion for the encrypted values. The Geometric Algebra operations permit homomorphic operations for adding, subtracting, multiplication and division of ciphertext multivectors such that the
(Continued)

100 BLOCK DIAGRAM OF HARDWARE IMPLEMENTATION FOR AN ENCRYPTED DATA TRANSFER EMBODIMENT resulting ciphertext, when decrypted, is equal to corresponding mathematical operations using the unencrypted values. The additional Hensel encoding of the coefficients of the multivectors does not impede the homomorphic aspects of the Geometric Algebra encryption operations. Operations for security key updates and exchanges are also provided.

13 Claims, 10 Drawing Sheets

Related U.S. Application Data on Aug. 7, 2019, provisional application No. 62/881,785, filed on Aug. 1, 2019, provisional application No. 62/881,793, filed on Aug. 1, 2019.

(51) Int. Cl.
*H04L 9/30* (2006.01)
*H04L 9/32* (2006.01)

(56) References Cited

U.S. PATENT DOCUMENTS

| | | |
|---|---|---|
| 9,906,360 B2 | 2/2018 | Johnson et al. |
| 10,211,975 B2* | 2/2019 | Loftus .................. G06F 21/602 |
| 10,560,257 B2* | 2/2020 | Hoffstein ................ G06F 17/16 |
| 2012/0140920 A1* | 6/2012 | Ghouti .................. H04L 9/0618 |
| | | 380/30 |
| 2018/0041481 A1* | 2/2018 | Paz de Araujo ...... H04L 9/0819 |
| 2019/0044697 A1* | 2/2019 | Paz de Araujo ........ H04L 9/085 |

* cited by examiner

100 BLOCK DIAGRAM OF HARDWARE IMPLEMENTATION FOR AN ENCRYPTED DATA TRANSFER EMBODIMENT

500 BLOCK DIAGRAM OF HARDWARE IMPLEMENTATION FOR AN ENCRYPTION KEY UPDATE EMBODIMENT

602

KEY UPDATE COMPUTER SYSTEM

IF A NEW HENSEL ENCODED SECRET KEY MULTIVECTOR ($\overline{K}_n$) IS NOT DESIGNATED THEN CREATE A NEW HENSEL ENCODED SECRET KEY MULTIVECTOR ($\overline{K}_n$) FROM A RANDOMLY GENERATED NEW SECRET KEY VALUE ($k_n$) IN ACCORD WITH OPERATIONS USED TO CREATE THE ORIGINAL HENSEL ENCODED SECRET KEY MULTIVECTOR ($\overline{K}_o$)
604

↓

CREATE A FIRST PUBLIC TOKEN ($\overline{T}_1$) AS A GEOMETRIC ALGEBRA PRODUCT OPERATION OF THE NEW HENSEL ENCODED SECRET KEY MULTIVECTOR ($\overline{K}_n$) AND AN INVERSE ($\overline{K}_o^{-1}$) OF THE ORIGINAL HENSEL ENCODED SECRET KEY MULTIVECTOR ($\overline{K}_o$)
606

↓

CREATE A SECOND PUBLIC TOKEN ($\overline{T}_2$) AS A GEOMETRIC ALGEBRA PRODUCT OPERATION OF THE ORIGINAL HENSEL ENCODED SECRET KEY MULTIVECTOR ($\overline{K}_o$) AND AN INVERSE ($\overline{K}_n^{-1}$) OF THE NEW HENSEL ENCODED SECRET KEY MULTIVECTOR ($\overline{K}_n$)
608

↓

UPDATE A CIPHERTEXT ($\overline{C}$) IN ACCORD WITH THE GEOMETRIC PRODUCT OPERATION $\overline{C} = \overline{T}_1 \overline{C} \overline{T}_2$ SUCH THAT THE ORIGINAL HENSEL ENCODED SECRET KEY MULTIVECTOR ($\overline{K}_o$) IS REPLACED FOR THE CIPHERTEXT ($\overline{C}$) WITH THE NEW HENSEL ENCODED SECRET KEY MULTIVECTOR ($\overline{K}_n$)
610

600 FLOW CHART OF A KEY UPDATE COMPUTER SYSTEM OPERATION FOR AN EMBODIMENT

FIG. 6

700 BLOCK DIAGRAM OF HARDWARE IMPLEMENTATION FOR AN ENCRYPTION KEY EXCHANGE EMBODIMENT

METHODS AND SYSTEMS FOR ENCRYPTION AND HOMOMORPHIC ENCRYPTION SYSTEMS USING GEOMETRIC ALGEBRA AND HENSEL CODES

CROSS REFERENCE TO RELATED APPLICATIONS

This application is based upon and claims the benefit of U.S. provisional applications Ser. No. 62/881,785, filed Aug. 1, 2019, entitled "Fully Homomorphic Encryption Over Geometric Product Spaces;" Ser. No. 62/8,793, filed Aug. 1, 2019, entitled "Fully Homomorphic Key Update and Key Exchange Over Exterior Product Spaces for Cloud Computing Applications;" Ser. No. 62/883,988, filed Aug. 7, 2019, entitled "A New Approach Towards Fully Homomorphic Encryption Over Geometric Algebra;" and Ser. No. 62/885,056, filed Aug. 9, 2019, entitled "Homomorphic Image Processing Over Geometric Product Spaces and Finite P-Adic Arithmetic;" all of which are also specifically incorporated herein by reference for all that they disclose and teach.

BACKGROUND OF THE INVENTION

In the last several decades, personal computers and other consumer computing devices, such has hand-held devices and smart phones, have become ubiquitous among the general public. As the proliferation of personal computers and other computing devices became prevalent, the usefulness of the computers and other computing devices was increased by interconnected communications between different computers/computing devices via various electronic networking communications systems. With the advent of the publicly accessible Internet and the establishment of the World Wide Web (WWW) for common communications between computers and/or other computing devices on the Internet, it became common for private identification and financial information to be transferred over the publicly accessible Internet. To ensure that the private information is not accessed by parties that are not intended to be privy to the private information, various encryption techniques have been applied to the private data being transferred over the Internet. As data storage has become accessible over networking technologies, including over the publicly accessible Internet, it has also become prudent to store sensitive data in an encrypted format.

Modern encryption employs mathematical techniques that manipulate positive integers or binary bits. Asymmetric encryption, such as RSA (Rivest-Shamir-Adleman), relies on number theoretic one-way functions that are predictably difficult to factor and can be made more difficult with an ever-increasing size of the encryption keys. Symmetric encryption, such as DES (Data Encryption Standard) and AES (Advanced Encryption Standard), uses bit manipulations within registers to shuffle the cryptotext to increase "diffusion" as well as register-based operations with a shared key to increase "confusion." Diffusion and confusion are measures for the increase in statistical entropy on the data payload being transmitted. The concepts of diffusion and confusion in encryption are normally attributed as first being identified by Claude Shannon in the 1940s. Diffusion is generally thought of as complicating the mathematical process of generating unencrypted (plain text) data from the encrypted (cryptotext) data, thus, making it difficult to discover the encryption key of the encryption process by spreading the influence of each piece of the unencrypted (plain) data across several pieces of the encrypted (cryptotext) data. Consequently, an encryption system that has a high degree of diffusion will typically change several characters of the encrypted (cryptotext) data for the change of a single character in the unencrypted (plain) data making it difficult for an attacker to identify changes in the unencrypted (plain) data. Confusion is generally thought of as obscuring the relationship between the unencrypted (plain) data and the encrypted (cryptotext) data. Accordingly, an encryption system that has a high degree of confusion would entail a process that drastically changes the unencrypted (plain) data into the encrypted (cryptotext) data in a way that, even when an attacker knows the operation of the encryption method (such as the public standards of RSA, DES, and/or AES), it is still difficult to deduce the encryption key.

Homomorphic Encryption is a form of encryption that allows computations to be carried out on cipher text as it is encrypted without decrypting the cipher text that generates an encrypted result which, when decrypted, matches the result of operations performed on the unencrypted plaintext.

The word homomorphism comes from the ancient Greek language: ≡μός (homos) meaning "same" and μορφή (morphe) meaning "form" or "shape." Homomorphism may have different definitions depending on the field of use. In mathematics, for example, homomorphism may be considered a transformation of a first set into a second set where the relationship between the elements of the first set are preserved in the relationship of the elements of the second set. For instance, a map f between sets A and B is a homomorphism of A into B if $$f(a_1 op\ a_2) = f(a_1) op\ f(a_2) | a_1, a_2 \in A$$

where "op" is the respective group operation defining the relationship between A and B.

More specifically, for abstract algebra, the term homomorphism may be a structure-preserving map between two algebraic structures such as groups, rings, or vector spaces. Isomorphisms, automorphisms, and endomorphisms are typically considered special types of homomorphisms. Among other more specific definitions of homomorphism, algebra homomorphism may be considered a homomorphism that preserves the algebra structure between two sets.

SUMMARY OF THE INVENTION

An embodiment of the present invention may comprise a method for encrypted transfer of numeric message data (m) from a source computing device to a destination computing device that incorporates use of Geometric Algebra multivectors that share a dimension size (N) that is at least two-dimensions and wherein a number of coefficients for each of the Geometric Algebra multivectors utilized herein is increased by a factor of two ($2^N$) for each incremental increase in the dimension size (N), the method comprising: generating by a secret key computing device at least one secret prime number (p) as a random prime number; calculating by the secret key computing device a public modulus (q) as a product of the at least one secret prime number (p) and at least one additional random number; generating by the secret key computing device at least one secret key value (k) as a random number; generating by the secret key computing device at least one secret key multivector ($\overline{K}$) representing the at least one secret key value (k) such that a sum of coefficient values of the at least one secret key multivector ($\overline{K}$) equals the at least one secret key value (k);

generating by the secret key computing device at least one Hensel encoded secret key multivector ($\overline{K_h}$) by obtaining Hensel code representations for each coefficient of the at least one secret key multivector ($\overline{K}$) as a function of Hensel encoding calculations based at least on each coefficient of the at least one secret key multivector ($\overline{K}$) and the secret shared prime number (p), and applying the Hensel code representations for each coefficient of the at least one secret key multivector ($\overline{K}$) to each orresponding coefficient of the at least one Hensel encoded secret key multivector ($\overline{K_h}$); sharing by the secret key computing device the at least one secret prime number (p), the at least one Hensel encoded secret key multivector ($\overline{K_h}$), and the public modulus (q) with the source computing device and the destination computing device wherein the sharing of the at least one secret prime number (p) and the at least one Hensel encoded secret key multivector ($\overline{K_h}$) is for the source computing device and the destination computing device but is kept secret from other devices not intended to have access to unencrypted data; generating by the source computing device a message multivector ($\overline{M}$) representing the numeric message data (m) such that a sum of coefficient values of the message multivector ($\overline{M}$) equals the numeric message data (m); making by the source computing device the message multivector ($\overline{M}$) isomorphic by performing a Geometric Algebra geometric product operation on the message multivector ($\overline{M}$) with an isomorphic multivector ($\overline{E}$), where the isomorphic multivector ($\overline{E}$) is an idempotent multivector that allows a Geometric Algebra geometric product result to be isomorphic; generating by the source computing device a Hensel encoded message multivector ($\overline{M_h}$) by obtaining Hensel code representations for each coefficient of the message multivector ($\overline{M}$) as a function of Hensel encoding calculations based at least on each coefficient of the message multivector ($\overline{M}$) and the secret shared prime number (p), and applying the Hensel code representations for each coefficient of the message multivector ($\overline{M}$) to each corresponding coefficient of the Hensel encoded message multivector ($\overline{M_h}$); encrypting by the source computing device the Hensel encoded message multivector ($\overline{M_h}$) to create a ciphertext multivector ($\overline{C}$) as a function of at least one Geometric Algebra geometric product operation on the Hensel encoded message multivector ($\overline{M}$) and the at least one Hensel encoded secret key multivector ($\overline{K_h}$), sending by the source computing device the ciphertext multivector ($\overline{C}$) to the destination computing system; receiving by the destination computing device the ciphertext multivector ($\overline{C}$); decrypting by the destination computing device the ciphertext multivector ($\overline{C}$) as a function of at least one Geometric Algebra geometric product operation on the ciphertext multivector ($\overline{C}$) and an inverse ($\overline{K_h}^{-1}$) of the at least one Hensel encoded secret key multivector ($\overline{K_h}$) back into the Hensel encoded message multivector ($\overline{M_h}$); generating by the destination computing device the message multivector ($\overline{M}$) by decoding Hensel code representations for each coefficient of the Hensel encoded message multivector ($\overline{M_h}$) as a function of Hensel decoding calculations based at least on each coefficient of the Hensel encoded message multivector ($\overline{M_h}$) and the secret shared prime number (p), and applying the decoded Hensel code representations for each coefficient of the Hensel encoded message multivector ($\overline{M_h}$) to each corresponding coefficient of the message multivector ($\overline{M}$); and generating by the destination computing device the numeric message data (m) by summing coefficients of the message multivector ($\overline{M}$).

An embodiment of the present invention may further comprise the method of the above paragraph: wherein the process of sending by the source computing device the ciphertext multivector ($\overline{C}$) to the destination computing system instead sends the ciphertext multivector ($\overline{C}$) to an intermediary computing system; and wherein the method of claim 1 further comprises: receiving by the intermediary computing system the ciphertext multivector ($\overline{C}$); generating by the intermediary computing system a homomorphic result ciphertext multivector ($\overline{RC}$) as a function of at least one Geometric Algebra addition, subtraction, multiplication or division operation of the ciphertext multivector ($\overline{C}$) with at least one stored ciphertext multivector ($\overline{SC}$) stored on the intermediary computing system resulting in the homomorphic result ciphertext multivector ($\overline{RC}$), wherein the at least one stored ciphertext multivector ($\overline{SC}$) was encrypted using equivalent encryption parameters and processes as used to encrypt the ciphertext multivector ($\overline{C}$); and sending by the intermediary computing device the homomorphic result ciphertext multivector ($\overline{RC}$) to the destination computing system; and wherein the destination computing device decrypts, decodes, and sums coefficients starting with the homomorphic result ciphertext multivector ($\overline{RC}$) instead of the ciphertext multivector ($\overline{C}$) so as to obtain numeric result data (r) such that the numeric result (r) is equal to an equivalent at least one addition, subtraction, multiplication or division of the unencrypted numeric message (m) and at least one unencrypted value corresponding to the at least one stored ciphertext multivector ($\overline{SC}$).

An embodiment of the present invention may further comprise a method for updating an original Hensel encoded secret key multivector ($\overline{K_o}$) associated with a ciphertext multivector ($\overline{C}$) to a new Hensel encoded secret key multivector ($\overline{K_n}$), the method comprising: creating by a key update computer system a first public token multivector ($\overline{T}_1$) as a Geometric Algebra product operation of the new Hensel encoded secret key multivector ($\overline{K_n}$) and an inverse ($\overline{K_o}^-$) of the original Hensel encoded secret key multivector ($\overline{K_o}$); creating by the key update computer system a second public token multivector ($\overline{T}_2$) as a Geometric Algebra product operation of the original Hensel encoded secret key multivector ($\overline{K_o}$) and an inverse ($\overline{K_n}^{-1}$) of the new Hensel encoded secret key multivector ($\overline{K_n}$); and updating by the key update computer system the ciphertext multivector ($\overline{C}$) as a result of a Geometric product operation ($\overline{C} = \overline{T}_1 \overline{CT}_2$) of the first public token multivector ($\overline{T}_1$), the ciphertext multivector ($\overline{C}$), and the second public token multivector ($\overline{T}_2$) such that the original Hensel encoded secret key multivector ($\overline{K}$) associated with the ciphertext multivector ($\overline{C}$) is updated to the new Hensel encoded secret key multivector ($\overline{K_n}$).

An embodiment of the present invention may further comprise a method for exchanging a Hensel encoded secret key multivector ($\overline{K}$) between a first computer system and a second computer system, the method comprising: creating by the first computer system a first Hensel encoded private identification multivector ($\overline{Pr}_1$) from a first randomly generated private identification number ($pr_1$); creating by the first computer system a first Hensel encoded public identification multivector ($\overline{Pu}_1$) from a first randomly generated public identification number ($pu_1$); creating by the second computer system a second Hensel encoded private identification multivector ($\overline{Pr}_2$) from a second randomly generated private identification number ($pr_2$); creating by the second computer system a second Hensel encoded public identification multivector ($\overline{Pu}_2$) from a second randomly generated public identification number ($pu_2$); sending by the second computer system the second Hensel encoded public identification multivector ($\overline{Pu}_1$) to the first computer system; generating by the first computer system a public communication identifier multivector ($\overline{G}$) as a Geometric Algebra geometric product operation of the first Hensel encoded public identification multivector ($\overline{Pu_1}$) and of the second Hensel encoded public identification multivector ($\overline{Pu_2}$); sending by the first computer system the public communication identifier multivector ($\overline{G}$) to the second computer system; generating by the first computer system a first subkey multivector ($\overline{S_1}$) as a Geometric Algebra geometric product of the first Hensel encoded private identification multivector ($\overline{Pr_1}$) and the public communication identifier multivector ($\overline{G}$); sending by the first computer system the first subkey multivector ($\overline{S_1}$) to the second computer system; generating by the second computer system a second subkey multivector ($\overline{S_1}$) as a Geometric Algebra geometric product of the public communication identifier multivector ($\overline{G}$) and the second Hensel encoded private identification multivector ($\overline{Pr_2}$); sending by the second computer system the second subkey multivector ($\overline{S_2}$) to the first computer system; calculating privately by the first computer system the Hensel encoded secret key multivector ($\overline{K}$) as a Geometric Algebra geometric product operation of the first Hensel encoded private identification multivector ($\overline{Pr_1}$), the second subkey multivector ($\overline{S_1}$), and the public communication identifier multivector ($\overline{G}$) plus a Geometric Algebra geometric addition operation of the public communication identifier multivector ($\overline{G}$); and calculating privately by the second computer system the Hensel encoded secret key multivector ($\overline{K}$) as a Geometric Algebra geometric product operation the first subkey multivector ($\overline{S_1}$), the second Hensel encoded private identification multivector ($\overline{Pr_2}$), and the public communication identifier multivector ($\overline{G}$) plus a Geometric Algebra geometric addition operation of the public communication identifier multivector ($\overline{G}$) such that now both of the first computer system and the second computer system have separately calculated the Hensel encoded secret key multivector ($\overline{K}$) without directly transferring the Hensel encoded secret key multivector ($\overline{K}$) between the first computer system and the second computer system.

An embodiment of the present invention may further comprise an encryption system for encrypted transfer of numeric message data (m) from a source computing device to a destination computing device that incorporates use of Geometric Algebra multivectors that share a dimension size (N) that is at least two-dimensions and wherein a number of coefficients for each of the Geometric Algebra multivectors utilized herein is increased by a factor of two ($2^N$) for each incremental increase in the dimension size (N), the encryption system comprising: a secret key computing device, wherein the secret key computing device further comprises: a secret prime number generation subsystem that generates at least one secret prime number (p) as a random prime number; a public modulus calculation subsystem that calculates a public modulus (q) as a product of the at least one secret prime number (p) and at least one additional random number; a secret key value generation subsystem that generates at least one secret key value (k) as a random number; a secret key multivector generation subsystem that generates at least one secret key multivector ($\overline{K}$) representing the at least one secret key value (k) such that a sum of coefficient values of the at least one secret key multivector ($\overline{K}$) equals the at least one secret key value (k); a Hensel encoded secret key multivector generation subsystem that generates at least one Hensel encoded secret key multivector ($\overline{K_h}$) by obtaining Hensel code representations for each coefficient of the at least one secret key multivector ($\overline{K}$) as a function of Hensel encoding calculations based at least on each coefficient of the at least one secret key multivector ($\overline{K}$) and the secret shared prime number (p), and applying the Hensel code representations for each coefficient of the at least one secret key multivector ($\overline{K}$) to each corresponding coefficient of the at least one Hensel encoded secret key multivector ($\overline{K_h}$); a key information share subsystem that the at least one secret prime number (p), the at least one Hensel encoded secret key multivector ($\overline{K_h}$), and the public modulus (q) with the source computing device and the destination computing device wherein the sharing of the at least one secret prime number (p) and the at least one Hensel encoded secret key multivector ($\overline{K_h}$) is for the source computing device and the destination computing device but is kept secret from other devices not intended to have access to unencrypted data; the source computing device, wherein the source computing device further comprises: a message multivector generation subsystem that generates a message multivector ($\overline{M}$) representing the numeric message data (m) such that a sum of coefficient values of the message multivector ($\overline{M}$) equals the numeric message data (m); a make message multivector isomorphic subsystem that makes the message multivector ($\overline{M}$) isomorphic by performing a Geometric Algebra geometric product operation on the message multivector ($\overline{M}$) with an isomorphic multivector ($\overline{E}$), where the isomorphic multivector ($\overline{E}$) is an idempotent multivector that allows a Geometric Algebra geometric product result to be isomorphic; a Hensel encoded message multivector generation subsystem that generates a Hensel encoded message multivector ($\overline{M_h}$) by obtaining Hensel code representations for each coefficient of the message multivector ($\overline{M}$) as a function of Hensel encoding calculations based at least on each coefficient of the message multivector ($\overline{M}$) and the secret shared prime number (p), and applying the Hensel code representations for each coefficient of the message multivector ($\overline{M}$) to each corresponding coefficient of the Hensel encoded message multivector ($\overline{M_h}$); a geometric product encryption subsystem that encrypts the Hensel encoded message multivector ($\overline{M_h}$) to create a ciphertext multivector ($\overline{C}$) as a function of at least one Geometric Algebra geometric product operation on the Hensel encoded message multivector ($\overline{M}$) and the at least one Hensel encoded secret key multivector ($\overline{K_h}$), a send ciphertext multivector subsystem that sends the ciphertext multivector ($\overline{C}$) to the destination computing system; and the destination computing device, wherein the destination computing device further comprises: a receive ciphertext multivector subsystem that receives the ciphertext multivector ($\overline{C}$); a geometric product decryption subsystem that decrypts the ciphertext multivector ($\overline{C}$) as a function of at least one Geometric Algebra geometric product operation on the ciphertext multivector ($\overline{C}$) and an inverse ($\overline{K_h}^{-1}$) of the at least one Hensel encoded secret key multivector ($\overline{K_h}$) back into the Hensel encoded message multivector ($\overline{M_h}$); a message multivector recovery subsystem that generates the message multivector ($\overline{M}$) by decoding Hensel code representations for each coefficient of the Hensel encoded message multivector ($\overline{M_h}$) as a function of Hensel decoding calculations based at least on each coefficient of the Hensel encoded message multivector ($\overline{M_h}$) and the secret shared prime number (p), and applying the decoded Hensel code representations for each coefficient of the Hensel encoded message multivector ($\overline{M_h}$) to each corresponding coefficient of the message multivector ($\overline{M}$); and a numeric message data recovery subsystem that generates the numeric message data (m) by summing coefficients of the message multivector ($\overline{M}$).

An embodiment of the present invention may further comprise the encryption system of the above paragraph: wherein the send ciphertext multivector subsystem of the source computing device sends the ciphertext multivector ($\overline{C}$) to an intermediary computing system instead of the destination computing device; wherein the encryption system of claim 10 further comprises the intermediary computing system and the intermediary computing system further comprises: a receive ciphertext multivector at intermediary subsystem that receives the ciphertext multivector ($\overline{C}$); a homomorphic calculation subsystem that generates a homomorphic result ciphertext multivector ($\overline{RC}$) as a function of at least one Geometric Algebra addition, subtraction, multiplication or division operation of the ciphertext multivector ($\overline{C}$) with at least one stored ciphertext multivector ($\overline{SC}$) stored on the intermediary computing system resulting in the homomorphic result ciphertext multivector ($\overline{RC}$), wherein the at least one stored ciphertext multivector ($\overline{SC}$) was encrypted using equivalent encryption parameters and processes as used to encrypt the ciphertext multivector ($\overline{C}$); and a send result ciphertext multivector subsystem that sends the homomorphic result ciphertext multivector ($\overline{RC}$) to the destination computing system; and wherein the destination computing device decrypts, decodes, and sums coefficients starting with the homomorphic result ciphertext multivector ($\overline{RC}$) instead of the ciphertext multivector ($\overline{C}$) so as to obtain numeric result data (r) such that the numeric result (r) is equal to an equivalent at least one addition, subtraction, multiplication or division of the unencrypted numeric message (m) and at least one unencrypted value corresponding to the at least one stored ciphertext multivector ($\overline{SC}$).

An embodiment of the present invention may further comprise a key update system that updates an original Hensel encoded secret key multivector ($\overline{K}_o$) associated with a ciphertext multivector ($\overline{C}$) to a new Hensel encoded secret key multivector ($\overline{K}_n$) associated, the key update system comprising: a first public token creation subsystem that creates a first public token multivector ($\overline{T}_1$) as a Geometric Algebra product operation of the new Hensel encoded secret key multivector ($\overline{K}_h$) and an inverse ($\overline{K}_o^{-1}$) of the original Hensel encoded secret key multivector ($\overline{K}_o$); a second public token creation subsystem that creates a second public token multivector ($\overline{T}_2$) as a Geometric Algebra product operation of the original Hensel encoded secret key multivector ($\overline{K}_o$) and an inverse ($\overline{K}_n^{-1}$) of the new Hensel encoded secret key multivector ($\overline{K}_h$); and an update ciphertext multivector key subsystem that updates the ciphertext multivector ($\overline{C}$) as a result of a Geometric product operation ($\overline{C}=\overline{T}_1\overline{C}\overline{T}_2$) of the first public token multivector ($\overline{T}_1$), the ciphertext multivector ($\overline{C}$), and the second public token multivector ($\overline{T}_2$) such that the original Hensel encoded secret key multivector ($\overline{K}$) associated with the ciphertext multivector ($\overline{C}$) is updated to the new Hensel encoded secret key multivector ($\overline{K}_n$).

An embodiment of the present invention may further comprise a key exchange system that exchanges a Hensel encoded secret key multivector ($\overline{K}$) between a first computer system and a second computer system, the key exchange system comprising: the first computer system, wherein the first computer system further comprises: a first private identification multivector creation subsystem that creates a first Hensel encoded private identification multivector ($\overline{Pr}_1$) from a first randomly generated private identification number ($pr_1$); a first public identification multivector creation subsystem that creates a first Hensel encoded public identification multivector ($\overline{Pu}_1$) from a first randomly generated public identification number ($pu_1$); a generate public communication identifier multivector subsystem that generates a public communication identifier multivector ($\overline{G}$) as a Geometric Algebra geometric product operation of the first Hensel encoded public identification multivector ($\overline{Pu}_1$) and of a second Hensel encoded public identification multivector ($\overline{Pu}_2$); a send public communication identifier subsystem that sends the public communication identifier multivector ($\overline{G}$) to the second computer system; a generate first subkey multivector subsystem that generates a first subkey multivector ($\overline{S}_l$) as a Geometric Algebra geometric product of the first Hensel encoded private identification multivector ($\overline{Pr}_1$) and the public communication identifier multivector ($\overline{G}$); a send first subkey multivector subsystem that sends the first subkey multivector ($\overline{S}_1$) to the second computer system; a first computer calculate secret key multivector subsystem that privately calculates the Hensel encoded secret key multivector ($\overline{K}$) as a Geometric Algebra geometric product operation of the first Hensel encoded private identification multivector ($\overline{Pr}_1$), the second subkey multivector ($\overline{S}_1$), and the public communication identifier multivector ($\overline{G}$) plus a Geometric Algebra geometric addition operation of the public communication identifier multivector ($\overline{G}$); and the second computer system, wherein the second computer system further comprises: a second private identification multivector creation subsystem that creates a second Hensel encoded private identification multivector ($\overline{Pr}_2$) from a second randomly generated private identification number ($pr_2$); a second public identification multivector creation subsystem that creates a second Hensel encoded public identification multivector ($\overline{Pu}_2$) from a second randomly generated public identification number ($pu_2$); a send second public identification multivector subsystem that sends the second Hensel encoded public identification multivector ($\overline{Pu}_2$) to the first computer system; a generate second subkey multivector subsystem that generates a second subkey multivector ($\overline{S}_1$) as a Geometric Algebra geometric product of the public communication identifier multivector ($\overline{G}$) and the second Hensel encoded private identification multivector ($\overline{Pr}_2$); a send second subkey multivector subsystem that sends the second subkey multivector ($\overline{S}_2$) to the first computer system; a second computer calculate secret key multivector subsystem that privately calculates the Hensel encoded secret key multivector ($\overline{K}$) as a Geometric Algebra geometric product operation the first subkey multivector ($\overline{S}_1$), the second Hensel encoded private identification multivector ($\overline{Pr}_2$), and the public communication identifier multivector ($\overline{G}$) plus a Geometric Algebra geometric addition operation of the public communication identifier multivector ($\overline{G}$) such that now both of the first computer system and the second computer system have separately calculated the Hensel encoded secret key multivector ($\overline{K}$) without directly transferring the Hensel encoded secret key multivector ($\overline{K}$) between the first computer system and the second computer system.

BRIEF DESCRIPTION OF THE DRAWINGS

In the drawings,

FIG. 6 is a flow chart of a key update computer system operation for an embodiment.

DETAILED DESCRIPTION OF THE EMBODIMENTS

Figure 1:
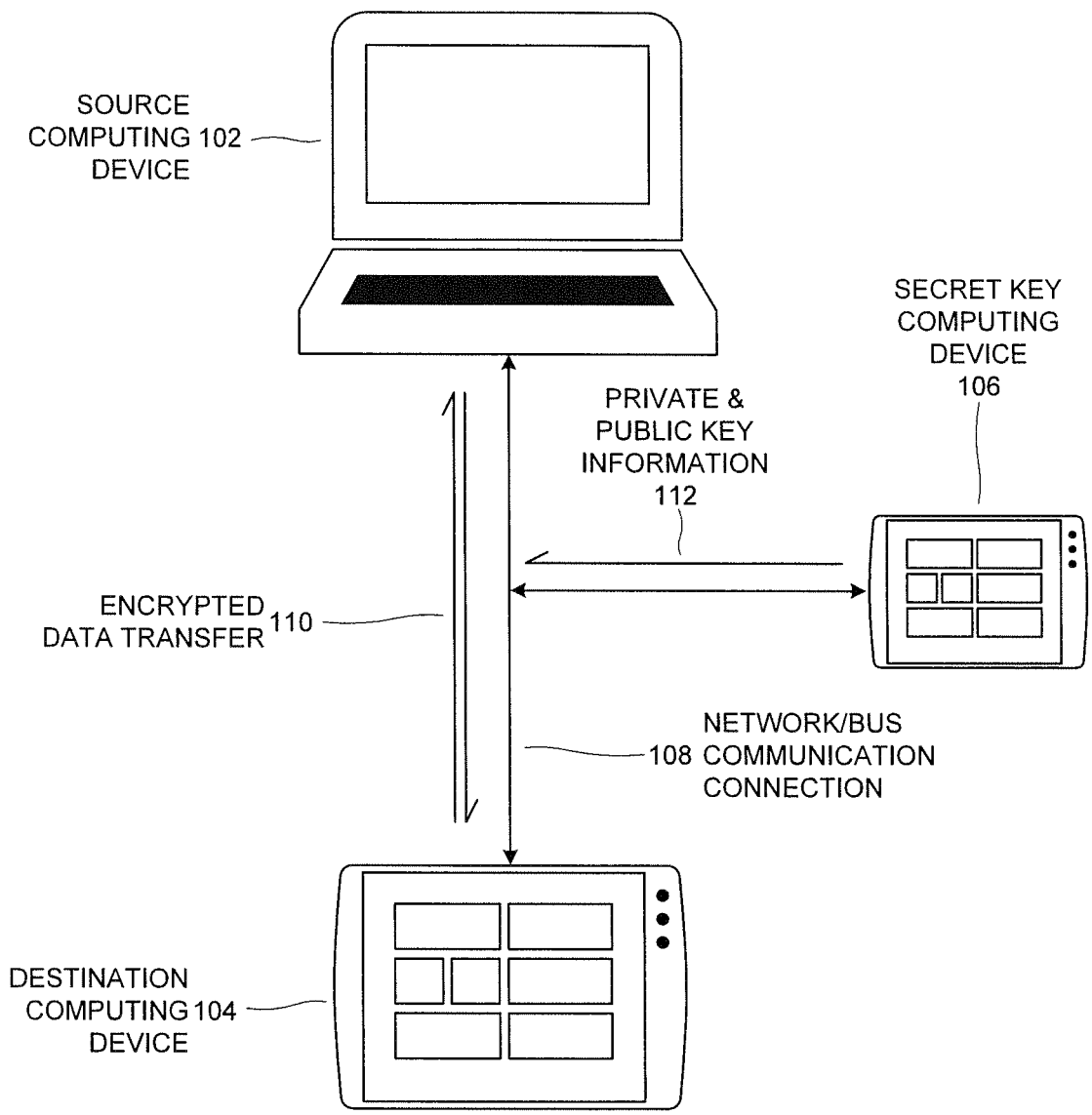
FIG. 1 is a block diagram of the hardware implementation for an encrypted data transfer embodiment.

Homomorphic Encryption is a form of encryption that allows computations to be carried out on cipher text as it is encrypted without decrypting the cipher text that generates an encrypted result which, when decrypted, matches the result of operations performed on the unencrypted plaintext.

The essential purpose of homomorphic encryption is to allow computation on encrypted data without decrypting the data in order to perform the computation. In this way, the encrypted data can remain confidential and secure while the encrypted data is processed for the desired computation. Accordingly, useful tasks may be accomplished on encrypted (i.e., confidential and secure) data residing in untrusted environments. In a world of distributed computation and heterogeneous networking, the ability to perform computations on encrypted data may be a highly desirable capability. Hence, finding a general method for computing on encrypted data is likely a highly desirable goal for cryptography.

The most sought after application of homomorphic encryption may be for cloud computing. Data that is stored in the Cloud is typically not encrypted, and the breach of the Cloud stored, unencrypted data is ranked by the Cloud Security Alliance as the number one threat to data security. Encrypting Cloud stored data may mitigate the threat of data being compromised by a breach, but then the remote clients (owners of the data) would not then be able to perform operations (i.e., add, multiply, etc.) on the Cloud stored data while the data remains in the Cloud. In order to perform operations on encrypted data stored in the Cloud, it would be necessary to download the encrypted Cloud stored data, decrypt the data, perform all desired operations on the data locally, encrypt the resulting data and send the resulting data back to the Cloud. Alternatively, if a user wants the Cloud services provider to perform the computations, the Cloud would require access to the user's encryption keys. It is becoming increasing undesirable to provide the Cloud access to a user's security keys as the more entities that have access to the security keys inherently increases the susceptibility of the security keys to being breached, or even stolen by an unscrupulous provider. Homomorphic encryption would allow the Cloud to operate on client data without decryption, and without access to the client's security keys.

An embodiment may advantageously utilize Geometric Algebra to provide the encryption and decryption of numeric messages that are to be transmitted through, and possibly have operations performed by, an intermediary computing system (e.g., the broad-based computing system currently, and commonly, referred to as the Cloud, or cloud computing). The various embodiments provide further security encryption, confusion, and diffusion by Hensel encoding each coefficient of the multivectors generated to perform the Geometric Algebra encryption and decryption processes. The use of Geometric Algebra to provide the encryption and decryption provides the mathematical basis for the homomorphic operations of an embodiment. The additional Hensel encoding of coefficients does not affect the inherent homomorphic aspects of the Geometric Algebra encryption and decryption processes.

Geometric Algebra is an area of mathematics that describes the geometric interaction of vectors and other objects in a context intended to mathematically represent physical interactions of objects in the physical world. As used herein, this area of mathematics encompasses Geometric Algebra, Conformal Geometric Algebra and Clifford Algebra (referred to collectively herein as "Geometric Algebra"). Generally, Geometric Algebra defines the operations, such as geometric product, inverses and identities, which facilitate many features of the various embodiments disclosed herein. Further, Geometric Algebra allows for the organization and representation of data into the "payload" of a multivector where the data in the payload may represent, for example, plaintext, ciphertext, or identifying signatures. Consequently, the various embodiments make beneficial use of Geometric Algebra properties to provide encryption, decryption, and intermediary homomorphic operations in a relatively computationally simplistic manner while still providing robust security for both data in motion and data at rest (e.g., data stored in the Cloud). The various embodiments further bolster the security of the encryption by incorporating Hensel encoding of the coefficients of the various multivectors, which may be done without affecting the homomorphic attributes of the various embodiments.

An embodiment that encrypts and decrypts messages using Geometric Algebra may utilize the intrinsic algebraic homomorphic properties of Geometric Algebra to permit arithmetic operations on encrypted messages handled by an intermediary computing system without the need for the intermediary computing system to decrypt the encrypted messages prior to performing the arithmetic operations. Accordingly, the intermediary computing system does not need to know any information regarding any of the secret security keys of the encryption/decryption processes to properly perform the arithmetic operations. The encrypted results of the arithmetic operations performed by the intermediary computing system, when decrypted at a destination computing device, produce results equivalent to the same operations as if the operations were performed on the unencrypted plain text messages. The various embodiments provide a cryptosystem that allows unlimited multiplications and additions of cipher text (i.e., transmitted/stored encrypted messages at the intermediary/cloud computer system) due to the intrinsic algebraic homomorphic properties of the Geometric Algebra utilized by the various embodiments. Thus, an embodiment may provide the homomorphic properties as a product of algebraic homomorphism without the need to use additional methods, such as "bootstrapping" (e.g., performing a recursive operation to reduce the noise associated with a cipher text) to achieve the homomorphic properties.

The encrypted data values may be stored on the intermediary computing system until such time that particular arithmetic operations are desired by a user, then the intermediary computing system may perform the desired arithmetic operations using the cipher text data stored at the intermediary computing system. Likewise, the encrypted data values may be immediately operated on by the intermediary computing system as soon as the subject encrypted data values are received by the intermediary computing system. However, as one skilled in the art will recognize, the process of receiving the encrypted data values at the intermediary computing system inherently includes storing the encrypted data values at the intermediary computing system even if only fleetingly in an immediately used and erased Random Access Memory (RAM) location or operational register location of a computational subsystem of the intermediary computing system.

The various embodiments may be comprised of functional blocks, each of which may be tailored as described in more detail below according to objectives for scope, capability and security. The following sections provide a mathematical and numerical description of these functional blocks.

A central feature of the various embodiments is the use of Geometric Algebra, an area of mathematics that has not been utilized before in encryption. Geometric Algebra as used herein is an area of mathematics that encompasses Geometric Algebra, Conformal Geometric Algebra and Clifford Algebra (collectively herein, "Geometric Algebra"). Geometric Algebra allows for the organization and representation of data into the "payload" of a multivector where the data may be plaintext, ciphertext, or signatures, for example. Geometric Algebra defines the operations, such as geometric product, inverses and identities, which are enablers of encryption/decryption calculations of the various embodiments.

Multivectors are simply the additive combination of a scalar, a vector, a bi-vector and so forth up to an n-dimension vector. However, the unit vectors follow the algebraic structure of quaternions (Hamilton) and non-commutative algebra (Grassman). These two types of algebra allowed Clifford to conceive of the Geometric Product which is used by the various embodiments as one of the "primitive" functions of the embodiments.

An example of a two-dimension (2D) multivector A that includes a scalar and a vector is:

$$\overline{A} = a_0 + a_1 \overline{e}_1 + a_2 \overline{e}_2 + a_{12} \overline{e}_{12}$$

where $\overline{e}_1$ is a unit vector along the i-axis and $\overline{e}_{12}$ represents the orientation of the area created by $a_{12}$. Notably, a Geometric Algebra multivector in N-space (i.e., a N-dimension multivector) has $2^N$ coefficients whereas a standard N-dimension vector has only N coefficients. Accordingly, the Geometric Algebra multivectors provide a sense of size, direction, and volume while a standard vector would only provide a sense of size and direction. As the concepts involved in Geometric Algebra are part of a deep and rich mathematical file, some general observations may be helpful to the description of the various embodiments disclosed herein, below. First, each of the $a_i$ values in the multivector $\overline{A}$ above may be "packed" with information and each $a_i$ value may range from zero to very large (e.g., >256,000 bits or an entire message). Secondly, the inverse of $\overline{A}$ when multiplied by $\overline{A}$ yields unity, or:

$$\overline{A}\overline{A}^{-1} = 1$$

Thus, if a second multivector $\overline{B}$ is created and the geometric product $\overline{AB}$ is transmitted, then the destination can recover $\overline{B}$ through:

$$\overline{A}\overline{A}^{-1}\overline{B} = \overline{B}$$

If a deeper understanding of the field of Geometric Algebra is desired, there are a variety of books and courses available for further exploration.

For the various embodiments, the "payload" may be packed in the values of the scalars and coefficients of the multivector elements. The packing method may define, among many things, the Geometric Algebra operations permissible an embodiment. For example, the Rationalize operation on multivectors yields zero when all multivector coefficients are equal. Such multivectors having all equal coefficients have no inverse and the geometric product of such multivectors having all equal coefficients with another multivector has no inverse. Different aspects of the various embodiments, including the decryption methodology that utilizes the inverse of the security key(s) multivector to perform the decryption. Therefore, to avoid problems when performing an inverse operation, the various multivectors being utilized in the various embodiments should not have all equal value coefficients.

For embodiments that intend to retain homomorphic properties for encrypted data messages, there is an additional restriction that the "packed" multivector that represents the original plaintext numeric message have a mathematical relationship (i.e., the homomorphic preserving mathematical relationship) to the original plaintext numeric message. In abstract algebra, the term homomorphism refers to a structure-preserving map between two algebraic structures, such as groups, rings, or vector spaces. An algebra homomorphism between two algebras is one that preserves the algebra structure. In order to preserve the algebra structure between arithmetic and Geometric Algebra operations, the method by which numbers are "packed" into multivector elements must remain a representation of the original number. One such relationship for packing the coefficients of the multivector that preserves homomorphic properties is to ensure that the coefficients of the multivector representation of the plaintext numeric message follow a mathematical data organization between the value of the plaintext numeric message and at least one of the values of the coefficients of the multivector representation of the plaintext numeric message where the mathematical operations incorporating the one or more values of the multivector coefficients have a result equal to the original plaintext numeric message value. The mathematical relationship may include: addition of at least one coefficient of the multivector coefficients, subtraction of at least one coefficient of the multivector coefficients, addition of a constant value, subtraction of a constant value, multiplication of at least one coefficient of the multivector coefficients by a constant value, and division of at least one coefficient of the multivector coefficients by a constant value. The location of the various mathematical operations relative to the particular locations of the coefficients in the multivector representation should also be consistently applied to all source numeric data messages converted to a multivector as well as for result multivectors converted to a result numeric data value in a particular encryption/decryption pathway. For the various embodiments disclosed herein, the mathematical relationship chosen is to simply have the sum of the coefficients of the multivector equal the value of the numeric data being represented by the multivector.

Hardware Implementation for Encrypted Data Transfer Embodiments (FIG. 1)

FIG. 1 is a block diagram 100 of the hardware implementation for an encrypted data transfer embodiment. The embodiment shown in FIG. 1 does not incorporate the homomorphic features permitted by the use of Geometric Algebra, but does represent the most basic aspects of an encryption system, the ability to encrypt, transfer and decrypt a message. For a description of an embodiment that incorporates the homomorphic properties of the Geometric Algebra encryption and decryption, please see the description with respect to FIG. 3 below. The operation of the encryption and decryption processes does not change when homomorphic calculations are performed, thus, this most basic encryption and decryption embodiment inherently incorporates the features of the various embodiments that do support the homomorphic calculations.

Turning back to the block diagram 100 shown in FIG. 1, a first computing device 102 is connected over an electronic network/bus connection 108 to a second computing device 104 and a third computing device 106. In the embodiment shown in FIG. 1, the first computing device 102 acts as the source computing device 102 that sends the encrypted data 110 over the network/bus connection 108. The second computing device 104 acts as the destination computing device 106 that receives the encrypted message 110 from the network/bus connection 108. The third computing device 106 is the secret key computing device 106 that prepares and provides to the other computing devices 102, 104 the private and public key information 112 necessary for the encryption and decryption processes. Generally, communications, including encrypted communications, are bi-directional such that the first 102, second 104, and third 106 computing devices may change roles as the source computing device 102, the destination computing device 104, and the secret key computing device 106 as is necessary to accommodate the transfer of data back and forth between the computing devices 102, 104, 106. Additionally, while the computing devices 102, 104, 106 are depicted as separate devices in FIG. 1, the functionality of the source computing device 102, the destination computing device 104, and/or the secret key computing device 106 may be shared on a single or among two computing devices as it is often desirable to encrypt the transfer of data between components of single device as well as it being highly likely that the source 102 or destination 104 computing devices would also act as the secret key computing device to prepare and disseminate the private and public key information 112.

Further, as shown in FIG. 1, the first computing device 102 appears to be a laptop computer and the second and third computing devices 104, 106 appear to be tablet devices. Generally, any computing device capable of communication over any form of electronic network or bus communication platform may be one, or two, or all of the first 102, second 106, and/or third 106 computing devices. Additionally, the first 102, second 104, and third 106 computing devices may actually be the same physical computing device communicating over an internal bus connection 104 with itself, but still desiring encrypted communication to ensure that an attacker cannot monitor the internal communications bus 104 to obtain sensitive data communications in an unencrypted format. Also, it may be quite common for the source 102 and/or destination 104 computing devices to perform the processes of the secret key computing device 106 in order to limit the number of devices with knowledge of the private encryption information.

Various embodiments may implement the network/bus communications channel 108 using any communications channel 108 capable of transferring electronic data between the first 102, second 104, and or third 106 computing devices. For instance, the network/bus communication connection 108 may be an Internet connection routed over one or more different communications channels during transmission from between the first 102, second 104, and/or third 106 computing devices. Likewise, the network/bus communication connection 108 may be an internal communications bus of a computing device, or even the internal bus of a processing or memory storage Integrated Circuit (IC) chip, such as a memory chip or a Central Processing Unit (CPU) chip. The network/bus communication channel 108 may utilize any medium capable of transmitting electronic data communications, including, but not limited to: wired communications, wireless electro-magnetic communications, fiber-optic cable communications, light/laser communications, sonic/sound communications, etc., and any combination thereof of the various communication channels.

The various embodiments may provide the control and management functions detailed herein via an application operating on the first 102, second 104, and/or third 106 computing devices. The first 102, second 104, and/or third 106 computing devices may each be a computer or computer system, or any other electronic devices device capable of performing the communications and computations of an embodiment. The first 102, second 104, and/or third 106 computing devices may include, but are not limited to: a general purpose computer, a laptop/portable computer, a tablet device, a smart phone, an industrial control computer, a data storage system controller, a CPU, a Graphical Processing Unit (GPU), an Application Specific Integrated Circuit (ASI), and/or a Field Programmable Gate Array (FPGA). Notably, the first 102, second 104, and/or third 106 computing devices may be the storage controller of a data storage media (e.g., the controller for a hard disk drive) such that data delivered to/from the data storage media is always encrypted so as to limit the ability of an attacker to ever have access to unencrypted data. Embodiments may be provided as a computer program product which may include a computer-readable, or machine-readable, medium having stored thereon instructions which may be used to program/operate a computer (or other electronic devices) or computer system to perform a process or processes in accordance with the various embodiments. The computer-readable medium may include, but is not limited to, hard disk drives, floppy diskettes, optical disks, Compact Disc Read-Only Memories (CD-ROMs), Digital Versatile Disc ROMS (DVD-ROMs), Universal Serial Bus (USB) memory sticks, magneto-optical disks, ROMs, random access memories (RAMs), Erasable Programmable ROMs (EPROMs), Electrically Erasable Programmable ROMs (EEPROMs), magnetic optical cards, flash memory, or other types of media/machine-readable medium suitable for storing electronic instructions. The computer program instructions may reside and operate on a single computer/electronic device or various portions may be spread over multiple computers/devices that comprise a computer system. Moreover, embodiments may also be downloaded as a computer program product, wherein the program may be transferred from a remote computer to a requesting computer by way of data signals embodied in a carrier wave or other propagation medium via a communication link (e.g., a modem or network connection, including both wired/cabled and wireless connections).

Figure 2A:
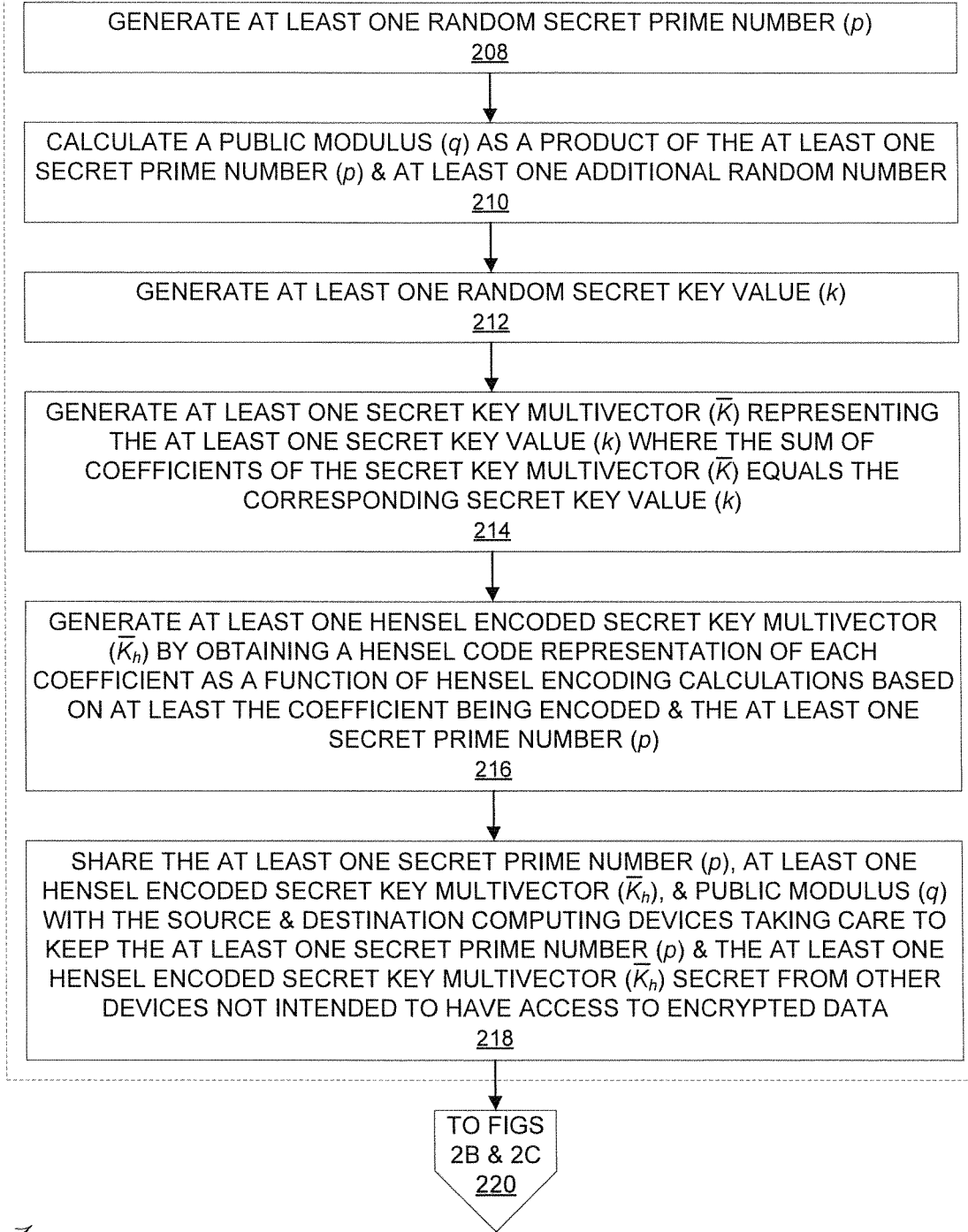
FIG. 2A is a flow chart of a secret key computing device operation for an encrypted data transfer embodiment.
Figure 2B:
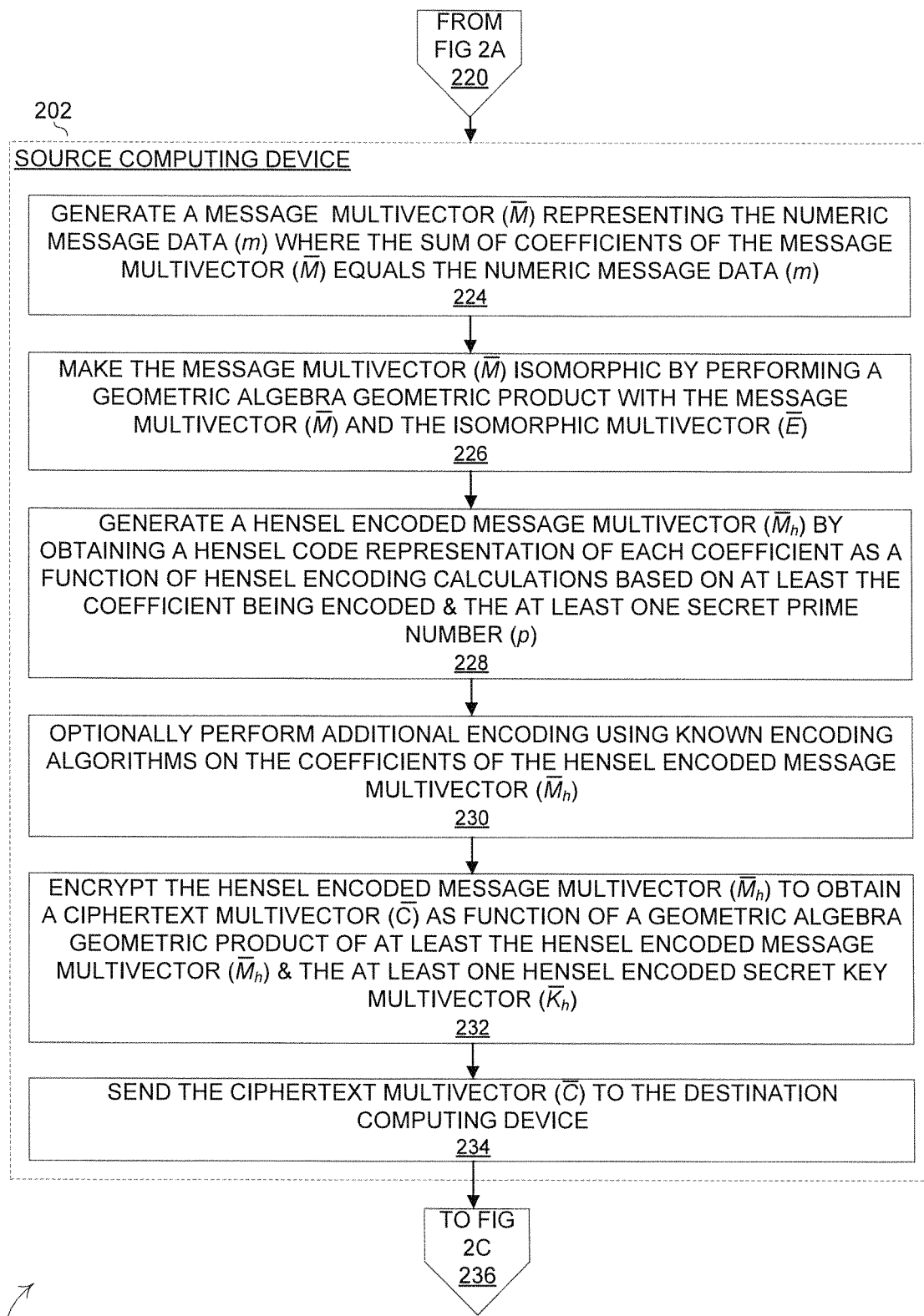
FIG. 2B is a flow chart of a source computing device operation for an encrypted data transfer embodiment.
Figure 2C:
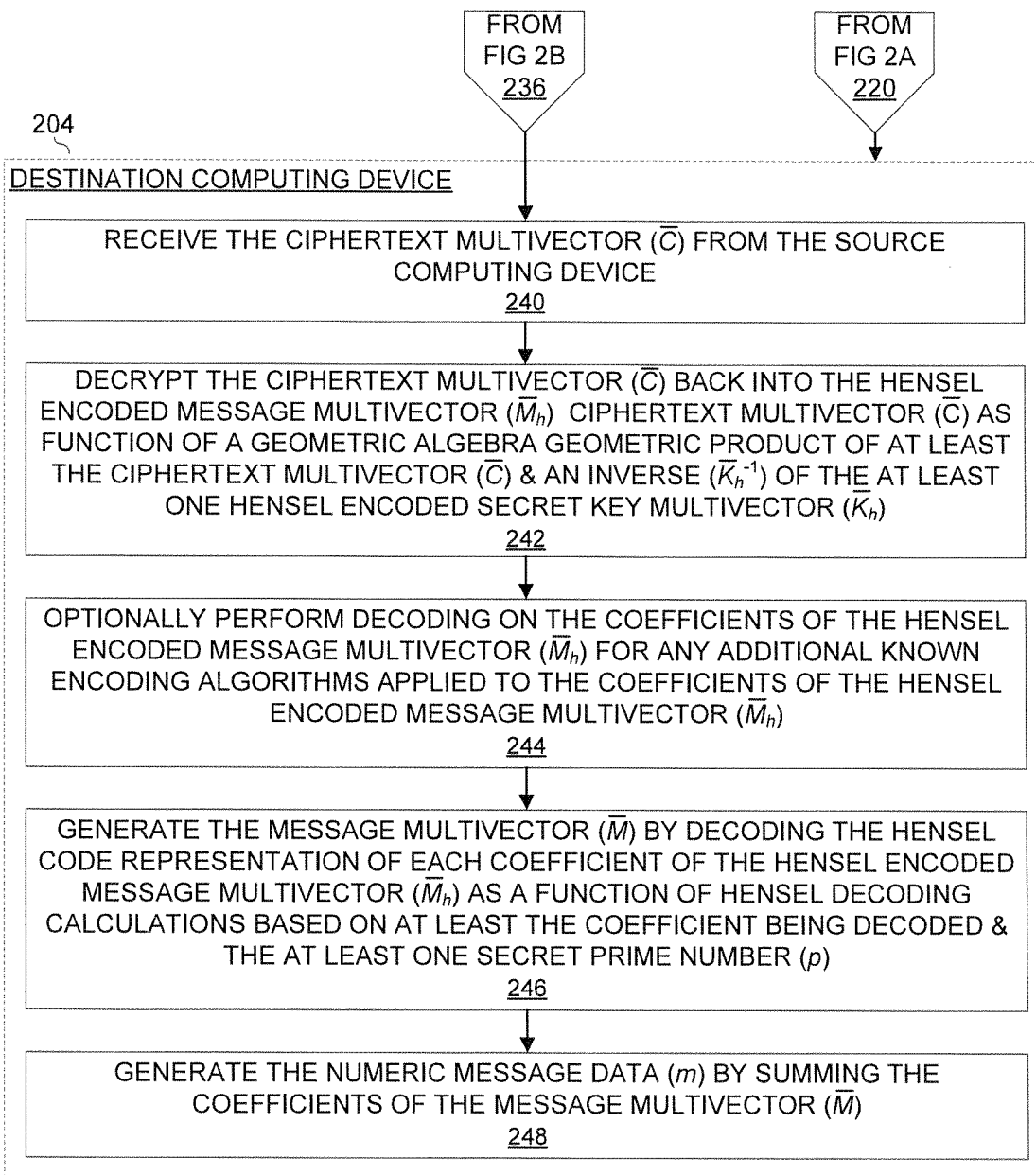
FIG. 2C is a flow chart of a destination computing device operation for an encrypted data transfer embodiment.

Operational Flow Charts for Encrypted Data Transfer Embodiments (FIGS. 2A-C)

FIGS. 2A-C are a flow chart 200, 222, 238 of the secret key computing device 206, source computing device 202, and source computing device 204 operations for an encrypted data transfer embodiment. FIG. 2A is a flow chart 200 of the secret key computing device 206 operation for an encrypted data transfer embodiment. At process 208, at least one secret prime number (p) is randomly generated by the secret key computing device 206. In order to add additional confusion/diffusion to the encryption/decryption operations, various embodiments may utilize multiple random prime numbers for a variety of purposes, including, but not limited to, providing additional parameters for the calculation of the public modulus (q) and/or enhancing the hensel encoding. At process 210, the secret key computing device 206 calculates a public modulus (q) as a product of the at least one secret prime number (p) and at least one additional random number. At process 212, the secret key computing device 206 generates at least one random key value (k). Some embodiments may choose to require that the secret key value (k) be a prime number and some embodiments may choose to have more than one secret key value (k).

At process 214, the secret key computing device 206 generates at least one secret key multivector ($\overline{K}$) that represents the at least one secret key value (k) where the sum of the coefficients of the at least one secret key multivector ($\overline{K}$) is equal to the corresponding at least one secret key value (k). At process 216, the secret key computing device 206 generates at least one Hensel encoded secret key multivector ($\overline{K}_h$) by obtaining a Hensel code representation of each coefficient of the at least one secret key multivector ($\overline{K}$) as a function of Hensel encoding calculations based on at least the coefficient being encoded and the at least one secret prime number (p). At process 218, the secret key computing device shares the at least one secret prime number (p), the at least one Hensel encoded secret key multivector ($\overline{K}_h$), and the public modulus (q) with the source 202 and destination 204 computing devices. Care should be taken for the sharing of the at least one secret prime number (p) and the at least one Hensel encoded secret key multivector ($\overline{K}_h$) as those are intended to be secret values and, accordingly, should be kept away from other devices not intended to have access to encrypted data. The sharing with the source 202 and destination 204 computing devices is indicated by off page connector 220.

FIG. 2B is a flow chart 222 of a source computing device 202 operation for an encrypted data transfer embodiment. Off page connector 220 indicates the sharing of the at least one secret prime number (p), the at least one Hensel encoded secret key multivector ($\overline{K}_h$), and the public modulus (q) from the secret key computing device 206. At process 224, the source computing device 202 generates a message multivector ($\overline{M}$) that represents the numeric message data (m) being encrypted where the sum of the coefficients of the message multivector ($\overline{M}$) is equal to the corresponding numeric message data value (m). At process 226, the source computing device 202 makes the message multivector ($\overline{M}$) isomorphic by performing a geometric algebra geometric product with the message multivector ($\overline{M}$) and the isomorphic multivector (E). The isomorphic multivector (E) is an idempotent multivector that allows a Geometric Algebra geometric product result to be isomorphic. Some embodiments may choose to apply the isomorphic multivector (E) to the message multivector ($\overline{M}$) after the message multivector ($\overline{M}$) has had its coefficients Hensel encoded, in which case before applying the isomorphic vector to the message multivector ($\overline{M}$) with Hensel encoded coefficients, the coefficients of the isomorphic multivector (E) should also be likewise Hensel encoded using the same Hensel encoding parameters as used for the message multivector ($\overline{M}$) hensel encoding. In fact, all Hensel encoding for a single embodiment should use the same basic parameters, such as the at least on secret prime number (p). At process 228, the source computing device 202 generates a Hensel encoded message multivector ($\overline{M}_h$) by obtaining a Hensel code representation of each coefficient of the message multivector ($\overline{M}$) as a function of Hensel encoding calculations based on at least the coefficient being encoded and the at least one secret prime number (p).

At process 230, the source computing device 202 may optionally perform and additional encoding technique or algorithm on each coefficient of the Hensel encoded message multivector ($\overline{M}_h$), such as modular exponentiation or the Chinese Remainder Theorem (CRT), in order to add additional confusion/diffusion to encryption embodiments. At process 232, the source computing device encrypts the Hensel encoded message multivector ($\overline{M}_h$) as a function of a Geometric Algebra geometric product of at least the Hensel encoded message multivector ($\overline{M}_h$) and the at least one Hensel encoded secret key multivector ($\overline{K}_h$) in order to obtain a ciphertext multivector ($\overline{C}$). At process 234, the source computing device 202 sends the ciphertext multivector ($\overline{C}$) to the destination computing device 204 and the processes for the destination computing system flow are connected through off page connector 236.

FIG. 2C is a flow chart 238 of a destination computing device 104 operation for an encrypted data transfer embodiment. Off page connector 220 indicates the sharing of the at least one secret prime number (p), the at least one Hensel encoded secret key multivector ($\overline{K}_h$), and the public modulus (q) from the secret key computing device 206 and Off page connector 236 indicates processes continuing from the source computing device 202 to the destination computing device 204. At process 240, the destination computing device 204 receives the ciphertext multivector ($\overline{C}$) from the source computing device 202. At process 242, the destination computing device 204 decrypts the ciphertext multivector ($\overline{C}$) as a function of at least one Geometric Algebra geometric product operation on the ciphertext multivector ($\overline{C}$) and an inverse ($\overline{K}_h^{-1}$) of the at least one Hensel encoded secret key multivector ($\overline{K}_h$) back into the Hensel encoded message multivector ($\overline{M}_h$). At process 244, the destination computing device 204 performs decoding on the coefficients of the Hensel encoded message multivector ($\overline{M}_h$) as necessary to account for any optionally applied additional know encoding techniques or algorithms applied to the coefficients of the Hensel encoded message multivector ($\overline{M}_h$) by the source computing device 202 at process 230. At process 246, the destination computing device 204 generates the message multivector ($\overline{M}$) by decoding the Hensel code representation of each coefficient of the Hensel encoded message multivector ($\overline{M}_h$) as a function of Hensel decoding calculations based on at least the coefficient being decoded and the at least one secret prime number (p). At process 248, the destination computing device 204 generates the numeric message data (m) by summing the coefficients of the message multivector ($\overline{M}_h$).

One skilled in the art will recognize that there are nearly limitless approaches for adding mathematical nuances to the Geometric Algebra and Hensel encoding encryption features of the various embodiments while maintaining the use of the Geometric Algebra and Hensel encoding concepts of the various embodiments. Accordingly, there is not an attempt in this document to discuss every possible variation, but instead, this document discloses the fundamental elements of the various embodiments and leaves the addition of nuances to an encryption system designer/implementer.

Additionally, while the flow charts and flow chart details described above with respect to FIGS. 2A-C describe a methodology that may be embodied as a method or process, another embodiment may be recognized as a computer system, and/or as a source computing device, a destination computing device, and/or a secret key computing device that encrypts data, transfers the data, and decrypts the data by implementing the processes described above with respect to the flow chart and flow chart details of FIGS. 2A-C. Further, in describing the computing device, and/or the source computing device, the destination computing device and/or the secret key computing device, that encrypts data, transfers the data, and decrypts the data, one, or more, individual processes described above for the methodology may be broken down and represented as a subsystem of the overall encryption computer system. A subsystem of the computer system, and/or the source computer system and the destination computer system, that encrypts data, transfers the data, and decrypts the data may be assigned, in whole or in part, to a particular hardware implemented system, such as a dedicated Application Specific Integrated Circuit (ASIC) or Field Programmable Gate Array (FPGA). One or more subsystems, in whole or in part, may alternatively be implemented as software or firmware instructions defining the operation of a computer system with specific regard to the one or more subsystems implemented as software or firmware instructions. The software or firmware instructions may cause the Central Processing Unit, memory, and/or other systems of a computer system to operate in particular accordance with the particular one or more subsystems designated features.

Homomorphic operations are an extension to the basic encrypted data transfer embodiment disclosed with respect to FIGS. 1 and 2A-C above. For the most part, the extension to support homomorphic operations relies on the intrinsic algebraic homomorphism of the Geometric Algebra foundation that is part of the encryption/decryption functions of the basic encrypted data transfer embodiment. For instance, the Geometric Algebra geometric product operations that perform the actual encryption and decryption operations remain the same for both simple encrypted data transfer and for homomorphic embodiments. Potential homomorphic operations for an embodiment may include multiple operations, such as, but not limited to: encrypted addition/subtraction, scalar addition/subtraction, encrypted multiplication, and scalar multiplication.

The description of homomorphic features of the various embodiments below will typically use the term "source" for the entity (e.g., computing device/system) where numeric values that are operands of the additive homomorphic operation originate and "destination" for the entity (e.g., computing device/system) that receives the result of the additive homomorphic operation. The term "intermediary" will typically define the "intermediate" entity acting in between the source(s) and destination on the encrypted numeric value operands originated at the source entity(ies). Alternatively, the term "client" may be used to describe the owner of the operand and/or result data (i.e., the source and/or destination computing device/system), while the generic term "cloud" may be used for data that is at rest in an untrusted environment (i.e., the intermediary computing system/device). In some respects, the terms "client" and "cloud" may more closely reflect a real world application where the source and destination are the same entity, sending data to the intermediary "cloud" for storage, then requesting an operation (e.g., a sum of stored transaction dollar amounts stored in encrypted format on the cloud) from the cloud when needed by the client. Ultimately, the terms source, destination, and intermediary reflect the relative operations being performed by computing system/device, and do not necessarily define the computing system/device as whole. Thus, the source, destination, and intermediary operations/systems may reside as a particular application on one or more computing systems/devices. As the source, destination, and intermediary computing systems/devices may be general purpose computing systems capable of running multiple applications at the same time, it is inherently possible that the source, destination, and intermediary operations are encapsulated as separate applications/functions that may permit, one, two, or all of the separate applications/functions to run on a single computing device/system. Also, a single interconnected computer system of a single owner/client may have untrusted environments that include data that is at rest (i.e., stored) in the owner/client's own end-point devices outside of the owner/client's digital secure perimeter.

For the various embodiments implementing homomorphic operations on encrypted data, the methods and systems that encrypt and decrypt messages using Geometric Algebra may utilize the intrinsic algebraic homomorphic properties of Geometric Algebra to permit arithmetic on encrypted messages handled by an intermediary computing system without the need for the intermediary computing system to decrypt the encrypted messages prior to performing the arithmetic and other comparative operations. Accordingly, the intermediary computing system does not need to know any information regarding any of the secret security keys of the encryption/decryption processes to properly perform the arithmetic and other comparative operations. The encrypted results of the arithmetic and other comparative operations performed by the intermediary computing system, when decrypted at a destination computing device, produce results equivalent to the same operations as if the operations were performed on the unencrypted plain text messages. In order to properly achieve the homomorphic effect for intermediary arithmetic operations, a proper data organization methodology (i.e., packing/distributing coefficients into a multivector) that preserves such homomorphic properties (i.e., the mathematical relationship between the vectors utilized in the encryption process and the original plaintext messages being encrypted) should be enforced on the choice of coefficients for the vectors representing the plain text messages. Homomorphism in the various embodiments is built upon the commutative nature of the Geometric Algebra operations of the encryption and decryption principles described above with respect to FIGS. 1 & 2A-C. Therefore, the distribution/packing data arrangement should also preserve a commutative mathematical relationship to the original numeric value being encrypted. In order to preserve the algebra structure between arithmetic and Geometric Algebra operations, the method by which numbers are "packed" into multivector elements must remain a representation of the original number. One such relationship for packing the coefficients of the multivector that preserves homomorphic properties is to ensure that the coefficients of the multivector representation of the plaintext numeric message follow a mathematical data organization between the value of the plaintext numeric message and at least one of the values of the coefficients of the multivector representation of the plaintext numeric message where the mathematical operations incorporating the one or more values of the multivector coefficients have a result equal to the original plaintext numeric message value (i.e., the homomorphic preserving mathematical relationship). The mathematical relationship may include: addition of at least one coefficient of the multivector coefficients, subtraction of at least one coefficient of the multivector coefficients, addition of a constant value, subtraction of a constant value, multiplication of at least one coefficient of the multivector coefficients by a constant value, and division of at least one coefficient of the multivector coefficients by a constant value. The location of the various mathematical operations relative to the particular locations of the coefficients in the multivector representation should also be consistently applied to all source numeric data messages converted to a multivector as well as for result multivectors converted to a result numeric data value in a particular encryption/decryption pathway. Ensuring that the coefficients of the vector representation of the plaintext numeric message meet the above described definition of the homomorphic preserving mathematical relationship will provide the proper commutative data organization (i.e., packing/ distributing) methodology that preserves the homomorphic properties of the Geometric Algebra operations of the encryption/decryption processes.

Figure 3:
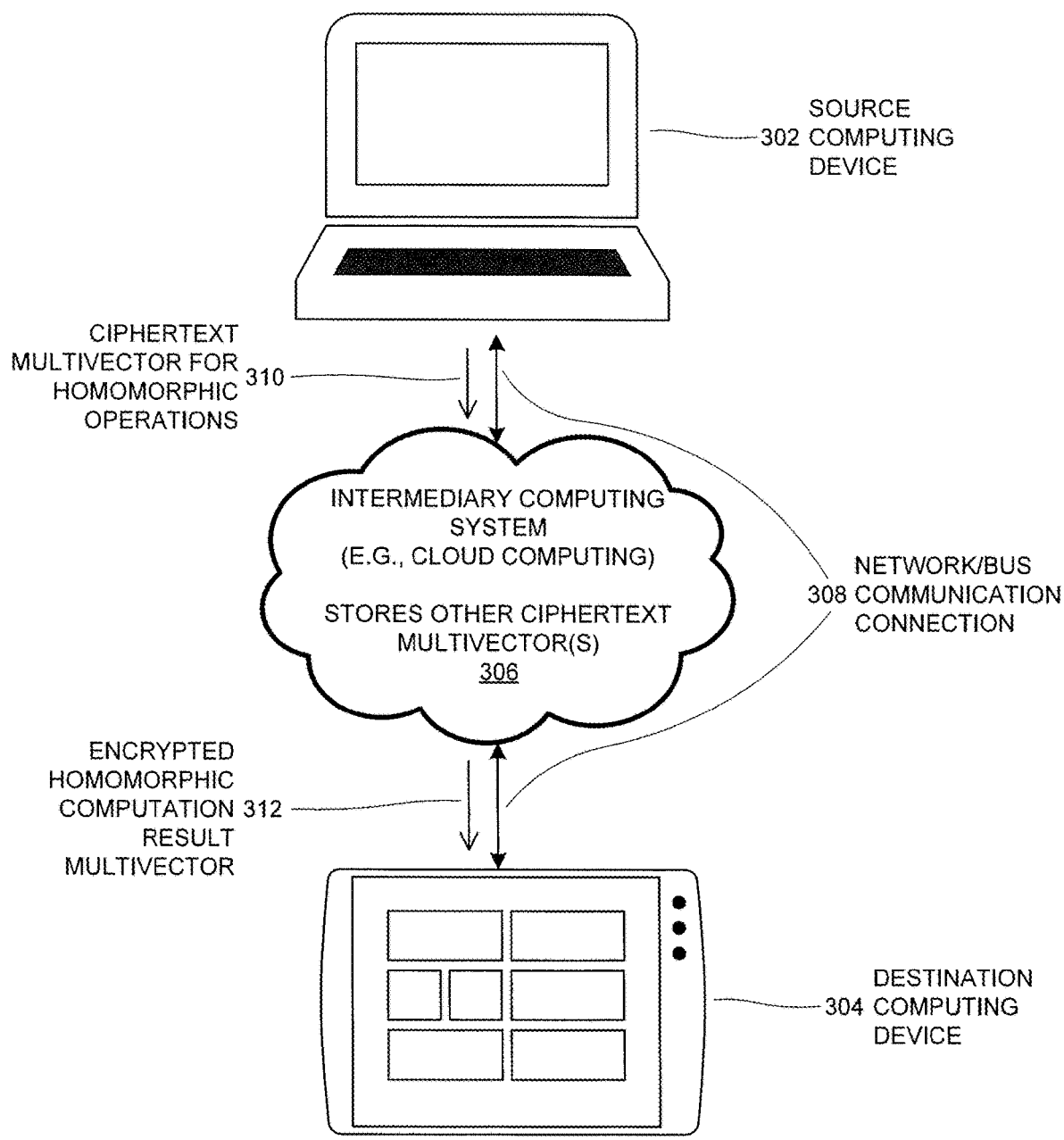
FIG. 3 is a block diagram of the hardware implementation for a homomorphic encryption embodiment.

Hardware Implementation for a Homomorphic Embodiment (FIG. 3)

FIG. 3 is a block diagram 300 of the hardware implementation for a homomorphic encryption embodiment. A source computing device 302 is connected over an electronic network/bus connection 308 to an intermediary (e.g., cloud) computing system 306. Similarly, the destination computing device 304 is also connected over the electronic network/bus connection 308 to the intermediary computing system 306. In the embodiment shown in FIG. 3, the source computing device 302 sends the ciphertext multivector 310 to the intermediary computing system 306 rather than sending the ciphertext multivector 310 to the destination computing device 304 directly. The intermediary computing system 306 may also have other ciphertext multivectors stored at the intermediary computing system 306 such that there is other encrypted data on the intermediary computing system that may be used at the intermediary computing system 306 to perform homomorphic operations such as addition and multiplication, which also means the possibility of performing homomorphic subtraction and division operations since subtraction and division are special cases of addition and multiplication operations, respectively. The intermediary computer system 306 has no knowledge of the secret key or other secret data for the encrypted ciphertext 310, but may still perform the homomorphic mathematical operations on the encrypted data to achieve the correct/equivalent mathematical result when the encrypted homomorphic computation result multivector 312 is decrypted and decoded to a numeric value by the destination computing device 304.

The intermediary computing system 306 may immediately perform a homomorphic mathematical operation using the ciphertext multivector 310 as soon as the ciphertext multivector 310 is received by the intermediary computing system 306 or the intermediary computing system 306 may store the ciphertext multivector 310 until such time that the intermediary computing system 306 is instructed to perform a homomorphic mathematical operation. Once the homomorphic mathematical operation is completed by the intermediary computing system 306, the intermediary computing system 306 sends the encrypted homomorphic computation result multivector 312 to the destination computing system 304 over the network/bus communication connection 308. The destination computing system 304 receives the encrypted homomorphic computation result multivector 312 from the network/bus communication connection 308 and decrypts the encrypted homomorphic computation result multivector 312 to obtain the desired plaintext computation result.

Generally, communications, including encrypted communications, are bi-directional such that the source computing device 302, the intermediary computing system 306, and/or the destination computing device 304 may change roles so as to operate as a source computing device 302, the intermediary computing system 306, and/or the destination computing device 304 as is necessary to accommodate the transfer of data back and forth between the source 302 and destination 304 computing devices as well as for computation of homomorphic mathematical operations at the intermediary computing system 306. For the homomorphic encryption embodiment of FIG. 3, as compared to the simple encrypted data transfer embodiments disclosed above with respect to FIGS. 1 & 2A-C, the ciphertext from the source computing device 302 is delivered to the intermediary computing system 306 rather than the destination computing device 304, and the intermediary computing system 306 delivers an encrypted homomorphic computation result 312 to the destination computing device 304 rather than the ciphertext multivector 310.

Further, as shown in FIG. 3, the source computing device 302 appears to be a laptop computer and the destination computing device 304 appears to be a tablet device. Generally, any computing device capable of communication over any form of electronic network or bus communication platform 308 may be one, multiple or all of the source computing device 302, the intermediary computing system 306, and/or the destination computing device 304. Further still, the source 302, intermediary 306, and destination computing devices/systems 304 may actually be the same physical computing device communicating over an internal bus connection 304 with itself, but still desiring encrypted communication to ensure that an attacker cannot monitor the internal communications bus 304 or hack an unprotected area of the computing system (i.e., the intermediary section 306) in order to obtain sensitive data communications in an unencrypted format.

Various embodiments may implement the network/bus communications channel 308 using any communications channel 308 capable of transferring electronic data between the source 302, intermediary 306, and/or destination 304 computing devices/systems. For instance, the network/bus communication connection 308 may be an Internet connection routed over one or more different communications channels during transmission from the source 302 to the intermediary 306 computing system, and then onto the destination computing device 304. Likewise, the network/bus communication connection 308 may be an internal communications bus of a computing device, or even the internal bus of a processing or memory storage Integrated Circuit (IC) chip, such as a memory chip or a Central Processing Unit (CPU) chip. The network/bus communication channel 308 may utilize any medium capable of transmitting electronic data communications, including, but not limited to: wired communications, wireless electro-magnetic communications, fiber-optic cable communications, light/laser communications, sonic/sound communications, etc., and any combination thereof of the various communication channels.

The various embodiments may provide the control and management functions detailed herein via an application operating on the source 302, intermediary 306, and/or destination 304 computing devices/systems. The source 302, intermediary 306, and/or destination 304 computing devices/systems may each be a computer or computer system, or any other electronic device capable of performing the communications and computations of an embodiment. The source 302, intermediary 306, and/or destination 304 computing devices/systems may include, but are not limited to: a general purpose computer, a laptop/portable computer, a tablet device, a smart phone, an industrial control computer, a data storage system controller, a CPU, a Graphical Processing Unit (GPU), an Application Specific Integrated Circuit (ASI), and/or a Field Programmable Gate Array (FPGA). Notably, the source 302 and destination 304 computing devices may be the storage controller of a data storage media (e.g., the controller for a hard disk drive) such that data delivered to/from the data storage media is always encrypted so as to limit the ability of an attacker to ever have access to unencrypted data. Embodiments may be provided as a computer program product which may include a computer-readable, or machine-readable, medium having stored thereon instructions which may be used to program/operate a computer (or other electronic devices) or computer system to perform a process or processes in accordance with the various embodiments. The computer-readable medium may include, but is not limited to, hard disk drives, floppy diskettes, optical disks, Compact Disc Read-Only Memories (CD-ROMs), Digital Versatile Disc ROMS (DVD-ROMs), Universal Serial Bus (USB) memory sticks, magneto-optical disks, ROMs, random access memories (RAMs), Erasable Programmable ROMs (EPROMs), Electrically Erasable Programmable ROMs (EEPROMs), magnetic optical cards, flash memory, or other types of media/machine-readable medium suitable for storing electronic instructions. The computer program instructions may reside and operate on a single computer/electronic device or various portions may be spread over multiple computers/devices that comprise a computer system. Moreover, embodiments may also be downloaded as a computer program product, wherein the program may be transferred from a remote computer to a requesting computer by way of data signals embodied in a carrier wave or other propagation medium via a communication link (e.g., a modem or network connection, including both wired/cabled and wireless connections).

Figure 4:
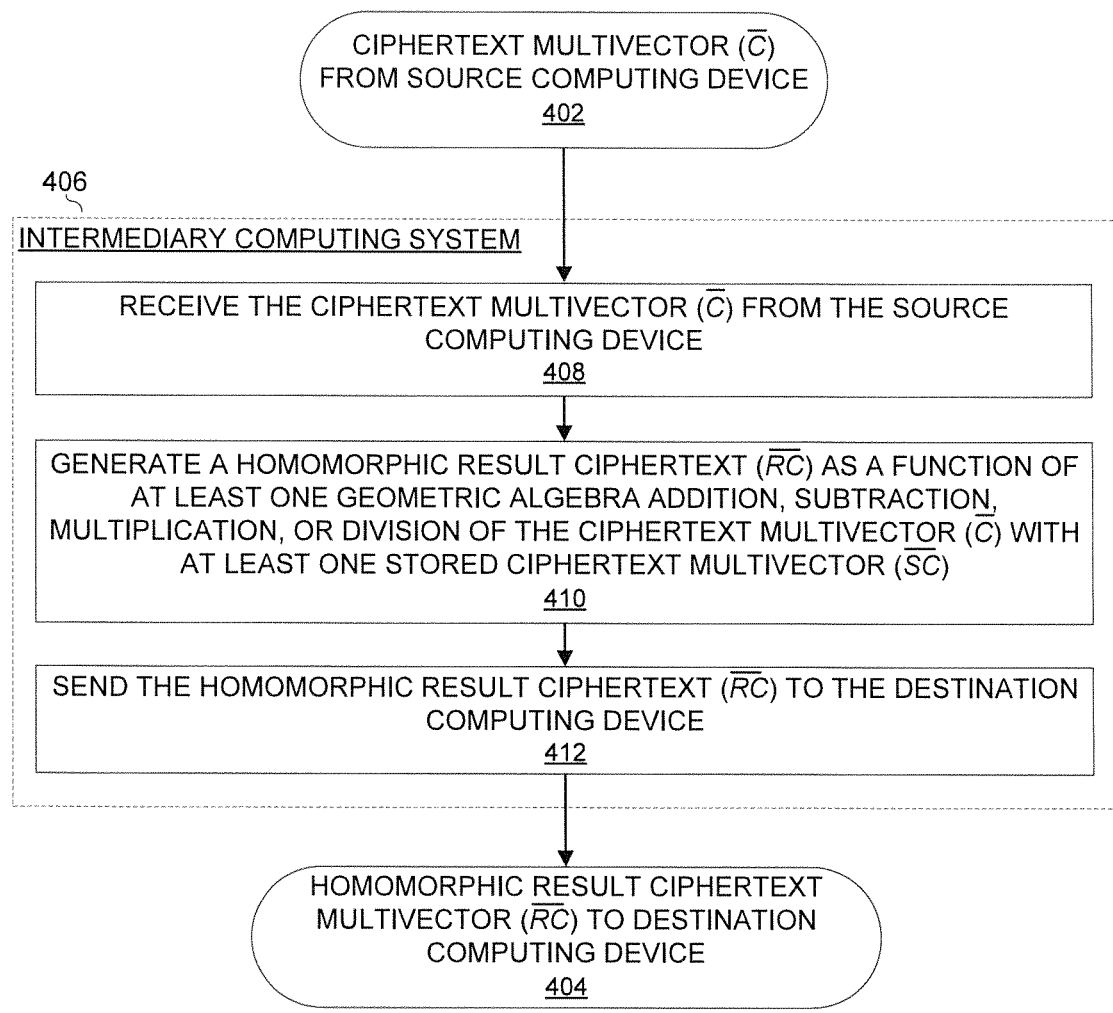
FIG. 4 is a flow chart of an intermediary computing system operation for a homomorphic encryption embodiment.

Operational Flow Chart for a Homomorphic Encryption Embodiment (FIG. 4)

FIG. 4 is a flow chart 400 of an intermediary computing system operation for a homomorphic encryption embodiment. At input 402, a ciphertext multivector ($\overline{C}$) is sent from the source computing device to the intermediary computing device. At process 408, the intermediary computing device 406 receives the ciphertext multivector ($\overline{C}$) from the source computing device. At process 410, the intermediary computing device 406 generates a homomorphic result ciphertext multivector ($\overline{RC}$) as a function of at least one Geometric Algebra addition, subtraction, multiplication, and/or division of the ciphertext multivector ($\overline{C}$) with at least one stored ciphertext multivector ($\overline{SC}$). In order to generate the homomorphic result ciphertext multivector ($\overline{RC}$), the intermediary computing system 406 does not need to decrypt any encrypted values and does not need to know of the secret encryption keys or prime numbers. At process 412, the intermediary computing system 406 sends the homomorphic result ciphertext multivector ($\overline{RC}$) to the destination computing device. At output 404, the homomorphic result ciphertext multivector ($\overline{RC}$) is delivered to the destination computing device and the destination computing device decrypts the homomorphic result ciphertext multivector j($\overline{RC}$) rather than the ciphertext multivector ($\overline{C}$) as was done in the disclosure with respect to FIGS. 1 & 2A-C above. One particular example of encrypted data that may be manipulated using homomorphic features is the field of image processing where it would be possible to perform operations such as adjusting brightness or contrast of encrypted images as well as combining images and other image processing applications without the need to decrypt the encrypted images to perform the image processing operations.

Additionally, while the flow charts and flow chart details described above with respect to FIG. 4 describe a methodology that may be embodied as a method or process, another embodiment may be recognized as a computer system, and/or as an intermediary computing device that stores and/or performs homomorphic operations of encrypted data by implementing the processes described above with respect to the flow chart and flow chart details of FIG. 4. Further, in describing the computing system, and/or the intermediary computing system, one, or more, individual processes described above for the methodology may be broken down and represented as a subsystem of the overall encryption computer system. A subsystem of the computer system, in whole or in part, may be assigned to a particular hardware implemented system, such as a dedicated Application Specific Integrated Circuit (ASIC) or Field Programmable Gate Array (FPGA). One or more subsystems, in whole or in part, may alternatively be implemented as software or firmware instructions defining the operation of a computer system with specific regard to the one or more subsystems implemented as software or firmware instructions. The software or firmware instructions may cause the Central Processing Unit, memory, and/or other systems of a computer system to operate in particular accordance with the particular one or more subsystems designated features.

Figure 5:
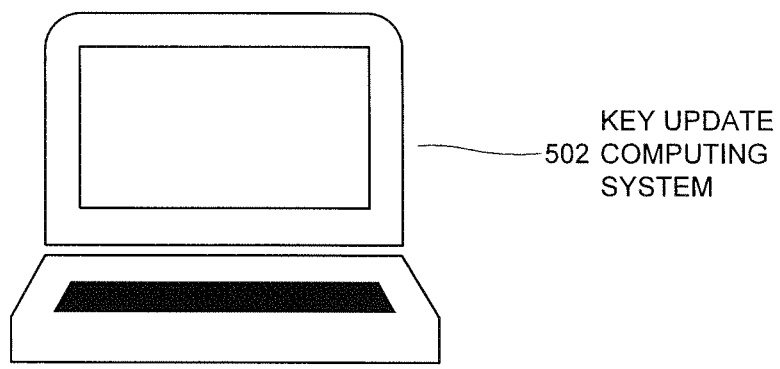
FIG. 5 is a block diagram of the hardware implementation for an encryption key update embodiment.

Hardware Implementation for an Encryption Key Update Embodiment (FIG. 5)

FIG. 5 is a block diagram 500 of the hardware implementation for an encryption key update embodiment. The hardware necessary for a key update embodiment is relatively simple being just the key update computing system 502. While it is possible for the key update computing system 502 to deliver the generated Tokens to other computing systems/device to permit those other computing systems/devices to also update the secret key multivector for ciphertexts stored on one or more of these other computing systems/devices.

The various embodiments may provide the control and management functions detailed herein via an application operating on the key update computing devices/systems 502. The key update computing device/system 502 may be a computer or computer system, or any other electronic device capable of performing the communications and computations of an embodiment. The key update computing device/system 502 may be comprised of, but is not limited to: a general purpose computer, a laptop/portable computer, a tablet device, a smart phone, an industrial control computer, a data storage system controller, a CPU, a Graphical Processing Unit (GPU), an Application Specific Integrated Circuit (ASI), and/or a Field Programmable Gate Array (FPGA). Embodiments may be provided as a computer program product which may include a computer-readable, or machine-readable, medium having stored thereon instructions which may be used to program/operate a computer (or other electronic devices) or computer system to perform a process or processes in accordance with the various embodiments. The computer-readable medium may include, but is not limited to, hard disk drives, floppy diskettes, optical disks, Compact Disc Read-Only Memories (CD-ROMs), Digital Versatile Disc ROMS (DVD-ROMs), Universal Serial Bus (USB) memory sticks, magneto-optical disks, ROMs, random access memories (RAMs), Erasable Programmable ROMs (EPROMs), Electrically Erasable Programmable ROMs (EEPROMs), magnetic optical cards, flash memory, or other types of media/machine-readable medium suitable for storing electronic instructions. The computer program instructions may reside and operate on a single computer/electronic device or various portions may be spread over multiple computers/devices that comprise a computer system. Moreover, embodiments may also be downloaded as a computer program product, wherein the program may be transferred from a remote computer to a requesting computer by way of data signals embodied in a carrier wave or other propagation medium via a communication link (e.g., a modem or network connection, including both wired/cabled and wireless connections).

Operational Flow Chart for an Encryption Key Update Embodiment (FIG. 6)

FIG. 6 is a flow chart 600 of a key update computer system operation for an embodiment. At process 604, the key update computer system 602 determines if there exists a new Hensel encoded secret key multivector ($\overline{K}_n$) designated to replace the original Hensel encoded secret key multivector ($\overline{K}_o$) and if a new Hensel encoded secret key multivector ($\overline{K}_n$) does not exist, then the key update computer system 602 creates a new Hensel encoded secret key multivector ($\overline{K}_n$) from a randomly generated new secret key value ($K_o$) in accord with operations used to create the original Hensel encoded secret key multivector ($\overline{K}_o$). At process 606, the key update computer system 602 creates a first public token ($T_1$) as a Geometric Algebra geometric product operation of the new Hensel encoded secret key multivector ($\overline{K}_n$) and an inverse ($\overline{K}_0^{-1}$) of the original Hensel encoded secret key multivector ($\overline{K}_n$). At process 608, the key update computer system 602 creates a second public token ($T_2$) as a Geometric Algebra geometric product operation of the original Hensel encoded secret key multivector ($\overline{K}_o$) and an inverse ($\overline{K}_n^{-1}$) of the new Hensel encoded secret key multivector ($\overline{K}_n$). At process 610, the key update computer system 602 updates a ciphertext multivector ($\overline{C}$) in accord with the Geometric product operation $\overline{C}=T_1\overline{C}T_2$ such that the original Hensel encoded secret key multivector ($\overline{K}_o$) associated with the ciphertext multivector ($\overline{C}$) is replaced for the ciphertext multivector ($\overline{C}$) with the new Hensel encoded secret key multivector ($\overline{K}_n$).

Additionally, while the flow charts and flow chart details described above with respect to FIG. 6 describe a methodology that may be embodied as a method or process, another embodiment may be recognized as a computer system, and/or as an key update computer system that performs the key replacement operations by implementing the processes described above with respect to the flow chart and flow chart details of FIG. 6. Further, in describing the computing system, and/or the key update computer system, one, or more, individual processes described above for the methodology may be broken down and represented as a subsystem of the overall key update computer system. A subsystem of the computer system, in whole or in part, may be assigned to a particular hardware implemented system, such as a dedicated Application Specific Integrated Circuit (ASIC) or Field Programmable Gate Array (FPGA). One or more subsystems, in whole or in part, may alternatively be implemented as software or firmware instructions defining the operation of a computer system with specific regard to the one or more subsystems implemented as software or firmware instructions. The software or firmware instructions may cause the Central Processing Unit, memory, and/or other systems of a computer system to operate in particular accordance with the particular one or more subsystems designated features.

Figure 7:
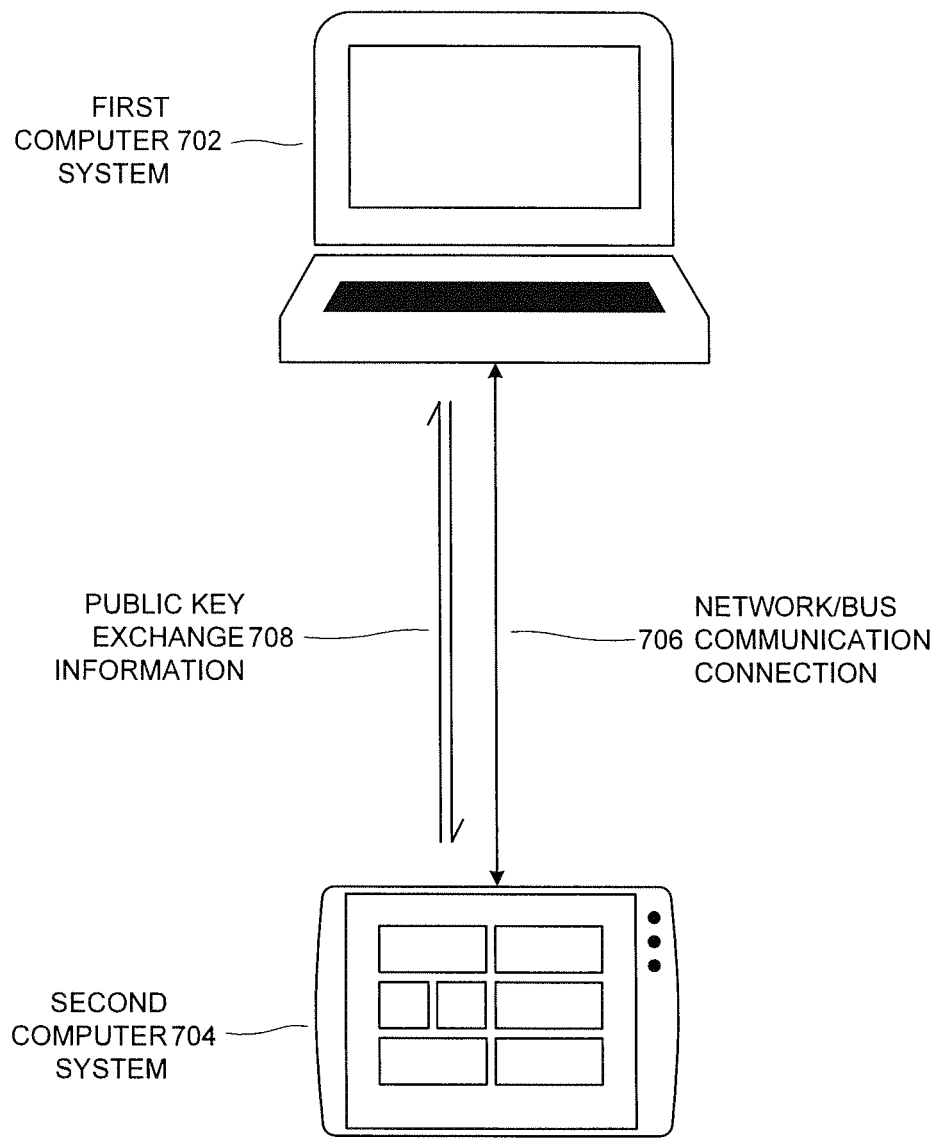
FIG. 7 is block diagram of the hardware implementation for an encryption key exchange embodiment.

Hardware Implementation for an Encryption Key Exchange Embodiment (FIG. 7)

FIG. 7 is block diagram 700 of the hardware implementation for an encryption key exchange embodiment. A first computer system 702 is connected over the electronic network/bus connection 706 to the second computer system 704. The first computer system 702 and second computer system 704 exchange public key exchange information 708 over the electronic network/bus connection 706 so that each of the first computer system 702 and the second computer systems 704 may separately calculate the Hensel encoded secret key multivector ($\overline{K}$) without directly transferring the Hensel encoded secret key multivector ($\overline{K}$) over the electronic network/bus connection 706.

Further, as shown in FIG. 7, the first computer system 702 appears to be a laptop computer and the second computer system 704 appears to be a tablet device. Generally, any computing device capable of communication over any form of electronic network or bus communication platform 706 may be one or both of the first computer system 702 and/or the second computer system 704. Further still, the first 702 ad second 704 computer systems may actually be the same physical computing device communicating over an internal bus connection 706 with itself.

Various embodiments may implement the network/bus communications channel 706 using any communications channel 706 capable of transferring electronic data between the first 702 and second 704 computer systems. For instance, the network/bus communication connection 706 may be an Internet connection routed over one or more different communications channels during transmission from the first 702 to the second 704 computing systems. Likewise, the network/bus communication connection 706 may be an internal communications bus of a computing device, or even the internal bus of a processing or memory storage Integrated Circuit (IC) chip, such as a memory chip or a Central Processing Unit (CPU) chip. The network/bus communication channel 706 may utilize any medium capable of transmitting electronic data communications, including, but not limited to: wired communications, wireless electro-magnetic communications, fiber-optic cable communications, light/laser communications, sonic/sound communications, etc., and any combination thereof of the various communication channels.

The various embodiments may provide the control and management functions detailed herein via an application operating on the first 702 and/or second 704 computer systems. The first 702 and/or second 704 computer systems may each be a computer or computer system, or any other electronic device capable of performing the communications and computations of an embodiment. The first 702 and/or second 704 computer systems may include, but are not limited to: a general purpose computer, a laptop/portable computer, a tablet device, a smart phone, an industrial control computer, a data storage system controller, a CPU, a Graphical Processing Unit (GPU), an Application Specific Integrated Circuit (ASI), and/or a Field Programmable Gate Array (FPGA). Embodiments may be provided as a computer program product which may include a computer-readable, or machine-readable, medium having stored thereon instructions which may be used to program/operate a computer (or other electronic devices) or computer system to perform a process or processes in accordance with the various embodiments. The computer-readable medium may include, but is not limited to, hard disk drives, floppy diskettes, optical disks, Compact Disc Read-Only Memories (CD-ROMs), Digital Versatile Disc ROMS (DVD-ROMs), Universal Serial Bus (USB) memory sticks, magneto-optical disks, ROMs, random access memories (RAMs), Erasable Programmable ROMs (EPROMs), Electrically Erasable Programmable ROMs (EEPROMs), magnetic optical cards, flash memory, or other types of media/machine-readable medium suitable for storing electronic instructions. The computer program instructions may reside and operate on a single computer/electronic device or various portions may be spread over multiple computers/devices that comprise a computer system. Moreover, embodiments may also be downloaded as a computer program product, wherein the program may be transferred from a remote computer to a requesting computer by way of data signals embodied in a carrier wave or other propagation medium via a communication link (e.g., a modem or network connection, including both wired/cabled and wireless connections).

Operational Flow Chart for an Encryption Key Exchange Embodiment (FIG. 8)

Figure 8:
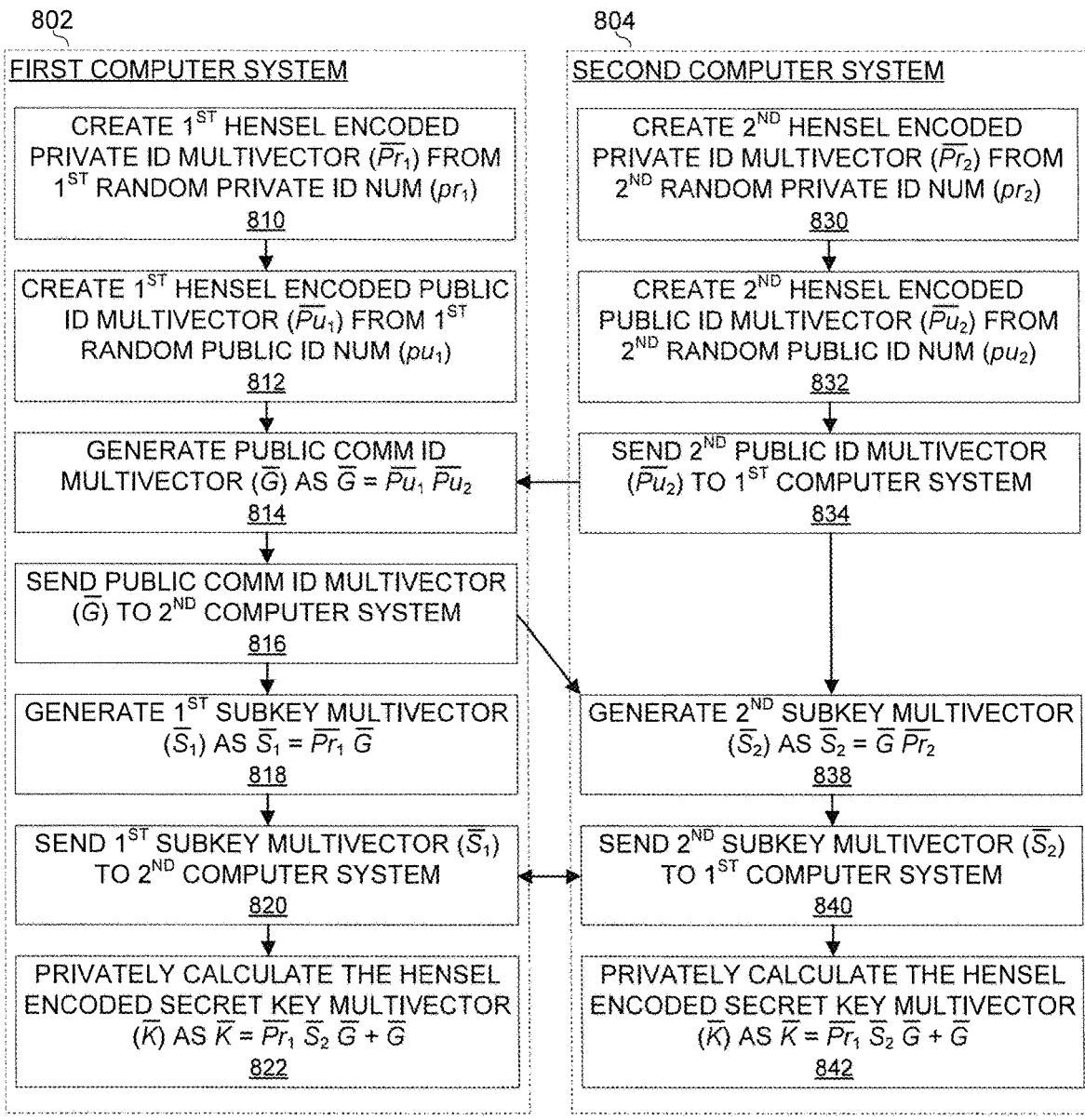
FIG. 8 is a flow chart of a key exchange system operation for an embodiment.

FIG. 8 is a flow chart 800 of a key exchange system operation for an embodiment. At process 810, the first computer system 802 creates a first Hensel encoded private identification multivector ($\overline{Pr}_1$) from a first randomly generated private identification number ($pr_1$). At process 812, the first computer system 802 creates a first Hensel encoded public identification multivector ($\overline{Pu}_1$) from a first randomly generated public identification number ($pu_1$). At process 830, the second computer system 804 creates a second Hensel encoded private identification multivector ($\overline{Pr}_2$) from a second randomly generated private identification number ($pr_2$). At process 832, the second computer system 804 creates a second Hensel encoded public identification multivector ($\overline{Pu}_2$) from a second randomly generated public identification number ($pu_2$). At process 834, the second computer system 804 sends the second Hensel encoded public identification multivector ($\overline{Pu}_2$) to the first computer system 802. At process 814, the first computer system 802 generates a public communication identifier multivector ($\overline{G}$) as a Geometric Algebra geometric product operation of the first Hensel encoded public identification multivector ($\overline{Pu}_1$) and of the second Hensel encoded public identification multivector ($\overline{Pu}_2$). At process 816, the first computer system 802 sends the public communication identifier multivector ($\overline{G}$) to the second computer system 804. At process 818, the first computer system 802 generates a first subkey multivector ($\overline{S}_1$) as a Geometric Algebra geometric product of the first Hensel encoded private identification multivector ($\overline{Pr}_1$) and the public communication identifier multivector ($\overline{G}$). At said process 820, the first computer system 802 sends the first subkey multivector ($\overline{S}_1$) to the second computer system 804. At process 838, the second computer system 804 generates a second subkey multivector ($\overline{S}_1$) as a Geometric Algebra geometric product of the public communication identifier multivector ($\overline{G}$) and the second Hensel encoded private identification multivector ($\overline{Pr}_2$). At process 840, the second computer system 804 sends the second subkey multivector ($\overline{S}_2$) to the first computer system 802. At process 822, the first computer system 802 privately calculates the Hensel encoded secret key multivector ($\overline{K}$) as a Geometric Algebra geometric product operation of the first Hensel encoded private identification multivector ($\overline{Pr}_1$), the second subkey multivector ($\overline{S}_1$), and the public communication identifier multivector ($\overline{G}$) plus a Geometric Algebra geometric addition operation of the public communication identifier multivector ($\overline{G}$). At process 842, the second computer system 804 privately calculates the Hensel encoded secret key multivector ($\overline{K}$) as a Geometric Algebra geometric product operation the first subkey multivector ($\overline{S}_1$), the second Hensel encoded private identification multivector ($\overline{Pr}_2$), and the public communication identifier multivector ($\overline{G}$) plus a Geometric Algebra geometric addition operation of the public communication identifier multivector ($\overline{G}$). Notably, both of the first computer system 802 and the second computer system 804 have separately calculated the Hensel encoded secret key multivector ($\overline{K}$) without directly transferring the Hensel encoded secret key multivector ($\overline{K}$) between the first computer system 802 and the second computer system 804.

Additionally, while the flow charts and flow chart details described above with respect to FIG. 8 describe a methodology that may be embodied as a method or process, another embodiment may be recognized as a computer system, and/or as an intermediary computing device that stores and/or performs homomorphic operations of encrypted data by implementing the processes described above with respect to the flow chart and flow chart details of FIG. 8. Further, in describing the computing system, and/or the intermediary computing system, one, or more, individual processes described above for the methodology may be broken down and represented as a subsystem of the overall encryption computer system. A subsystem of the computer system, in whole or in part, may be assigned to a particular hardware implemented system, such as a dedicated Application Specific Integrated Circuit (ASIC) or Field Programmable Gate Array (FPGA). One or more subsystems, in whole or in part, may alternatively be implemented as software or firmware instructions defining the operation of a computer system with specific regard to the one or more subsystems implemented as software or firmware instructions. The software or firmware instructions may cause the Central Processing Unit, memory, and/or other systems of a computer system to operate in particular accordance with the particular one or more subsystems designated features.

The foregoing description of the invention has been presented for purposes of illustration and description. It is not intended to be exhaustive or to limit the invention to the precise form disclosed, and other modifications and variations may be possible in light of the above teachings. The embodiments were chosen and described in order to best explain the principles of the invention and its practical application to thereby enable others skilled in the art to best utilize the invention in various embodiments and various modifications as are suited to the particular use contemplated.

What is claimed is:

1. A method for encrypted transfer of numeric message data (m) from a source computing device to a destination computing device that incorporates use of Geometric Algebra multivectors that share a dimension size (N) that is at least two-dimensions and wherein a number of coefficients for each of said Geometric Algebra multivectors utilized herein is increased by a factor of two ($2^N$) for each incremental increase in said dimension size (N), the method comprising:

generating by a secret key computing device at least one secret prime number (p) as a random prime number;

calculating by said secret key computing device a public modulus (q) as a product of said at least one secret prime number (p) and at least one additional random number;

generating by said secret key computing device at least one secret key value (k) as a random number;

generating by said secret key computing device at least one secret key multivector ($\overline{K}$) representing said at least one secret key value (k) such that a sum of coefficient values of said at least one secret key multivector ($\overline{K}$) equals said at least one secret key value (k);

generating by said secret key computing device at least one Hensel encoded secret key multivector ($\overline{K}_h$) by obtaining Hensel code representations for each coefficient of said at least one secret key multivector ($\overline{K}$) as a function of Hensel encoding calculations based at least on each coefficient of said at least one secret key multivector ($\overline{K}$) and said secret shared prime number (p), and applying said Hensel code representations for each coefficient of said at least one secret key multivector ($\overline{K}$) to each corresponding coefficient of said at least one Hensel encoded secret key multivector ($\overline{K_h}$);

sharing by said secret key computing device said at least one secret prime number (p), said at least one Hensel encoded secret key multivector ($\overline{K_h}$), and said public modulus (q) with said source computing device and said destination computing device wherein said sharing of said at least one secret prime number (p) and said at least one Hensel encoded secret key multivector ($\overline{K_h}$) is for said source computing device and said destination computing device but is kept secret from other devices not intended to have access to unencrypted data;

generating by said source computing device a message multivector ($\overline{M}$) representing said numeric message data (m) such that a sum of coefficient values of said message multivector ($\overline{M}$) equals said numeric message data (m);

making by said source computing device said message multivector ($\overline{M}$) isomorphic by performing a Geometric Algebra geometric product operation on said message multivector ($\overline{M}$) with an isomorphic multivector ($\overline{E}$), where said isomorphic multivector ($\overline{E}$) is an idempotent multivector that allows a Geometric Algebra geometric product result to be isomorphic;

generating by said source computing device a Hensel encoded message multivector ($\overline{M_h}$) by obtaining Hensel code representations for each coefficient of said message multivector ($\overline{M}$) as a function of Hensel encoding calculations based at least on each coefficient of said message multivector ($\overline{M}$) and said secret shared prime number (p), and applying said Hensel code representations for each coefficient of said message multivector ($\overline{M}$) to each corresponding coefficient of said Hensel encoded message multivector ($\overline{M_h}$);

encrypting by said source computing device said Hensel encoded message multivector ($\overline{M_h}$) to create a ciphertext multivector ($\overline{C}$) as a function of at least one Geometric Algebra geometric product operation on said Hensel encoded message multivector ($\overline{M}$) and said at least one Hensel encoded secret key multivector ($\overline{K_h}$), sending by said source computing device said ciphertext multivector ($\overline{C}$) to said destination computing system;

receiving by said destination computing device said ciphertext multivector ($\overline{C}$);

decrypting by said destination computing device said ciphertext multivector ($\overline{C}$) as a function of at least one Geometric Algebra geometric product operation on said ciphertext multivector ($\overline{C}$) and an inverse ($\overline{K_h}^{-1}$) of said at least one Hensel encoded secret key multivector ($\overline{K_h}$) back into said Hensel encoded message multivector ($\overline{M_h}$);

generating by said destination computing device said message multivector ($\overline{M}$) by decoding Hensel code representations for each coefficient of said Hensel encoded message multivector ($\overline{M_h}$) as a function of Hensel decoding calculations based at least on each coefficient of said Hensel encoded message multivector ($\overline{M_h}$) and said secret shared prime number (p), and applying said decoded Hensel code representations for each coefficient of said Hensel encoded message multivector ($\overline{M_h}$) to each corresponding coefficient of said message multivector ($\overline{M}$); and generating by said destination computing device said numeric message data (m) by summing coefficients of said message multivector ($\overline{M}$).

2. The method of claim 1 wherein said process of making said message multivector ($\overline{M}$) isomorphic is performed after said message multivector ($\overline{M}$) has been updated to said Hensel encoded message multivector ($\overline{M_h}$) such that said isomorphic multivector ($\overline{E}$) is also updated such that coefficients of said isomorphic multivector ($\overline{E}$) are also Hensel encoded in accord with Hensel encoding for said Hensel encoded message multivector ($\overline{M_h}$) prior to performing said Geometric Algebra geometric product operation on said Hensel encoded message multivector ($\overline{M_h}$) with said isomorphic multivector ($\overline{E}$).

3. The method of claim 1:
wherein said process of sending by said source computing device said ciphertext multivector ($\overline{C}$) to said destination computing system instead sends said ciphertext multivector ($\overline{C}$) to an intermediary computing system; and wherein said method of claim 1 further comprises:
receiving by said intermediary computing system said ciphertext multivector ($\overline{C}$);

generating by said intermediary computing system a homomorphic result ciphertext multivector ($\overline{RC}$) as a function of at least one Geometric Algebra addition, subtraction, multiplication or division operation of said ciphertext multivector ($\overline{C}$) with at least one stored ciphertext multivector ($\overline{SC}$) stored on said intermediary computing system resulting in said homomorphic result ciphertext multivector ($\overline{RC}$), wherein said at least one stored ciphertext multivector ($\overline{SC}$) was encrypted using equivalent encryption parameters and processes as used to encrypt said ciphertext multivector ($\overline{C}$); and sending by said intermediary computing device said homomorphic result ciphertext multivector ($\overline{RC}$) to said destination computing system; and wherein said destination computing device decrypts, decodes, and sums coefficients starting with said homomorphic result ciphertext multivector ($\overline{RC}$) instead of said ciphertext multivector ($\overline{C}$) so as to obtain numeric result data (r) such that said numeric result (r) is equal to an equivalent at least one addition, subtraction, multiplication or division of said unencrypted numeric message (m) and at least one unencrypted value corresponding to said at least one stored ciphertext multivector ($\overline{SC}$).

4. The method of claim 3 wherein said Geometric Algebra addition, subtraction, multiplication or division operations are used to perform image processing operations on at least one encrypted image.

5. The method of claim 1 further comprising:
performing by said source computing device a known additional encoding operation on each coefficient of said Hensel encoded message multivector ($\overline{M_h}$) prior to said process of encrypting by said source computing device said Hensel encoded message multivector ($\overline{M_h}$) to create a ciphertext multivector ($\overline{C}$) as said function of at least one Geometric Algebra geometric product operation on said Hensel encoded message multivector ($\overline{M}$) and said at least one Hensel encoded secret key multivector ($\overline{K_h}$); and performing by said destination computing device any necessary decoding operations associated with said known additional encoding operation on each coefficient of said Hensel encoded message multivector ($\overline{M_h}$) resulting from said process of decrypting by said destination computing device said ciphertext multivector ($\overline{C}$) as said function of at least one Geometric Algebra geometric product operation on said ciphertext multivector ($\overline{C}$) and an inverse ($\overline{K_h}^{-1}$) of said at least one Hensel encoded secret key multivector ($\overline{K_h}$) and prior to said process of generating by said destination computing device said message multivector ($\overline{M}$) by decoding Hensel code representations for each coefficient of said Hensel encoded message multivector ($\overline{M_h}$).

6. The method of claim 5 wherein said known additional encoding operation is comprised of at least one of a group chosen from: modular exponentiation, and Chinese Remainder Theorem (CRT).

7. An encryption system for encrypted transfer of numeric message data (m) from a source electronic computing device to a destination electronic computing device that incorporates use of Geometric Algebra multivectors that share a dimension size (N) that is at least two-dimensions and wherein a number of coefficients for each of said Geometric Algebra multivectors utilized herein is increased by a factor of two ($2^N$) for each incremental increase in said dimension size (N), the encryption system comprising:
 a secret key electronic computing device, wherein said secret key electronic computing device further comprises:
  a secret prime number generation subsystem that generates at least one secret prime number (p) as a random prime number;
  a public modulus calculation subsystem that calculates a public modulus (q) as a product of said at least one secret prime number (p) and at least one additional random number;
  a secret key value generation subsystem that generates at least one secret key value (k) as a random number;
  a secret key multivector generation subsystem that generates at least one secret key multivector ($\overline{K}$) representing said at least one secret key value (k) such that a sum of coefficient values of said at least one secret key multivector ($\overline{K}$) equals said at least one secret key value (k);
  a Hensel encoded secret key multivector generation subsystem that generates at least one Hensel encoded secret key multivector ($\overline{K_h}$) by obtaining Hensel code representations for each coefficient of said at least one secret key multivector ($\overline{K}$) as a function of Hensel encoding calculations based at least on each coefficient of said at least one secret key multivector ($\overline{K}$) and said secret shared prime number (p), and applying said Hensel code representations for each coefficient of said at least one secret key multivector ($\overline{K}$) to each corresponding coefficient of said at least one Hensel encoded secret key multivector ($\overline{K_h}$);
 a key information share subsystem that said at least one secret prime number (p), said at least one Hensel encoded secret key multivector ($\overline{K_h}$), and said public modulus (q) with said source electronic computing device and said destination electronic computing device wherein said sharing of said at least one secret prime number (p) and said at least one Hensel encoded secret key multivector ($\overline{K_h}$) is for said source electronic computing device and said destination electronic computing device but is kept secret from other devices not intended to have access to unencrypted data;
 said source electronic computing device, wherein said source electronic computing device further comprises:
  a message multivector generation subsystem that generates a message multivector ($\overline{M}$) representing said numeric message data (m) such that a sum of coefficient values of said message multivector ($\overline{M}$) equals said numeric message data (m);
  a make message multivector isomorphic subsystem that makes said message multivector ($\overline{M}$) isomorphic by performing a Geometric Algebra geometric product operation on said message multivector ($\overline{M}$) with an isomorphic multivector ($\overline{E}$), where said isomorphic multivector ($\overline{E}$) is an idempotent multivector that allows a Geometric Algebra geometric product result to be isomorphic;
  a Hensel encoded message multivector generation subsystem that generates a Hensel encoded message multivector ($\overline{M_h}$) by obtaining Hensel code representations for each coefficient of said message multivector ($\overline{M}$) as a function of Hensel encoding calculations based at least on each coefficient of said message multivector ($\overline{M}$) and said secret shared prime number (p), and applying said Hensel code representations for each coefficient of said message multivector ($\overline{M}$) to each corresponding coefficient of said Hensel encoded message multivector ($\overline{M_h}$);
  a geometric product encryption subsystem that encrypts said Hensel encoded message multivector ($\overline{M_h}$) to create a ciphertext multivector ($\overline{C}$) as a function of at least one Geometric Algebra geometric product operation on said Hensel encoded message multivector ($\overline{M}$) and said at least one Hensel encoded secret key multivector ($\overline{K_h}$),
  a send ciphertext multivector subsystem that sends said ciphertext multivector ($\overline{C}$) to said destination computing system; and
 said destination electronic computing device, wherein said destination electronic computing device further comprises:
  a receive ciphertext multivector subsystem that receives said ciphertext multivector ($\overline{C}$);
  a geometric product decryption subsystem that decrypts said ciphertext multivector ($\overline{C}$) as a function of at least one Geometric Algebra geometric product operation on said ciphertext multivector ($\overline{C}$) and an inverse ($\overline{K_h}^{-1}$) of said at least one Hensel encoded secret key multivector ($\overline{K_h}$) back into said Hensel encoded message multivector ($\overline{M_h}$);
  a message multivector recovery subsystem that generates said message multivector ($\overline{M}$) by decoding Hensel code representations for each coefficient of said Hensel encoded message multivector ($\overline{M_h}$) as a function of Hensel decoding calculations based at least on each coefficient of said Hensel encoded message multivector ($\overline{M_h}$) and said secret shared prime number (p), and applying said decoded Hensel code representations for each coefficient of said Hensel encoded message multivector ($\overline{M_h}$) to each corresponding coefficient of said message multivector ($\overline{M}$);
  a numeric message data recovery subsystem that generates said numeric message data (m) by summing coefficients of said message multivector ($\overline{M}$); and
 wherein said secret key electronic computing device, said source electronic computing device, and said destination electronic computing device are each comprised of at least one hardware computation processing device.

8. The encryption system of claim 7 wherein when said make message multivector isomorphic subsystem operates after said Hensel encoded message multivector generation subsystem, said make message multivector isomorphic subsystem further updates said isomorphic multivector ($\overline{E}$) such that coefficients of said isomorphic multivector ($\overline{E}$) are also Hensel encoded in accord with Hensel encoding for said Hensel encoded message multivector ($\overline{M_h}$) prior to operation of said Hensel encoded message multivector generation subsystem.

9. The encryption system of claim 7:
   wherein said send ciphertext multivector subsystem of said source electronic computing device sends said ciphertext multivector ($\overline{C}$) to an intermediary computing system instead of said destination electronic computing device;
   wherein said encryption system of claim 7 further comprises said intermediary computing system and said intermediary computing system further comprises:
   a receive ciphertext multivector at intermediary subsystem that receives said ciphertext multivector ($\overline{c}$);
   a homomorphic calculation subsystem that generates a homomorphic result ciphertext multivector ($\overline{RC}$) as a function of at least one Geometric Algebra addition, subtraction, multiplication or division operation of said ciphertext multivector ($\overline{C}$) with at least one stored ciphertext multivector ($\overline{SC}$) stored on said intermediary computing system resulting in said homomorphic result ciphertext multivector ($\overline{RC}$), wherein said at least one stored ciphertext multivector ($\overline{SC}$) was encrypted using equivalent encryption parameters and processes as used to encrypt said ciphertext multivector ($\overline{C}$); and
   a send result ciphertext multivector subsystem that sends said homomorphic result ciphertext multivector ($\overline{RC}$) to said destination computing system; and
   wherein said destination electronic computing device decrypts, decodes, and sums coefficients starting with said homomorphic result ciphertext multivector ($\overline{RC}$) instead of said ciphertext multivector ($\overline{C}$) so as to obtain numeric result data (r) such that said numeric result (r) is equal to an equivalent at least one addition, subtraction, multiplication or division of said unencrypted numeric message (m) and at least one unencrypted value corresponding to said at least one stored ciphertext multivector ($\overline{SC}$).

10. The encryption system of claim 9 wherein said Geometric Algebra addition, subtraction, multiplication or division operations are used to perform image processing operations on at least one encrypted image.

11. The encryption system of claim 7:
    wherein said source electronic computing device further comprises an additional known encoding subsystem that performs a known additional encoding operation on each coefficient of said Hensel encoded message multivector ($\overline{M_h}$) prior to operation of said geometric product encryption subsystem; and
    wherein said destination electronic computing device further comprises an additional known decoding subsystem that performs any necessary decoding operations associated with said known additional encoding operation on each coefficient of said Hensel encoded message multivector ($\overline{M_h}$) resulting from said geometric product decryption subsystem and prior to operation of said message multivector recovery subsystem.

12. The encryption system of claim 11 wherein said known additional encoding operation is comprised of at least one of a group chosen from: modular exponentiation, and Chinese Remainder Theorem (CRT).

13. The encryption system of claim 7 each said at least one hardware computation processing subsystem is comprised of at least one of a group chosen from: a general-purpose computer, a laptop/portable computer, a tablet device, a smart phone, an industrial control computer, a data storage system controller, a CPU, a Graphical Processing Unit (GPU), an Application Specific Integrated Circuit (ASIC), and/or a Field Programmable Gate Array (FPGA).

* * * * *